(12) United States Patent
Carlson

(10) Patent No.: US 6,378,671 B1
(45) Date of Patent: Apr. 30, 2002

(54) MAGNETICALLY ACTUATED MOTION CONTROL DEVICE

(75) Inventor: J. David Carlson, Raleigh, NC (US)

(73) Assignee: Lord Corporation, Cary, NC (US)

(*) Notice: Subject to any disclaimer, the term of this patent is extended or adjusted under 35 U.S.C. 154(b) by 0 days.

(21) Appl. No.: 09/537,365

(22) Filed: Mar. 29, 2000

(51) Int. Cl.⁷ .................................................. F16F 9/53
(52) U.S. Cl. ............... 188/267.2; 188/271; 188/322.19; 267/196
(58) Field of Search ............................. 188/267, 267.1, 188/267.2, 271, 280, 266.1, 134, 272, 800, 322.19; 267/196, 67

(56) References Cited

U.S. PATENT DOCUMENTS

| | | |
|---|---|---|
| 1,907,531 A | 5/1933 | Fitzgerald et al. |
| 2,938,606 A | 5/1960 | Passman |
| 3,483,951 A | 12/1969 | Bonesho et al. |
| 3,807,678 A | 4/1974 | Karnopp et al. |
| 3,866,720 A | 2/1975 | Wallerstein, Jr. |
| 4,491,207 A | 1/1985 | Boonchanta et al. |
| 4,638,896 A | 1/1987 | Poyser |
| 4,727,974 A | 3/1988 | Takatoshi |
| 4,827,162 A | 5/1989 | Morris et al. |
| 4,836,342 A | 6/1989 | Wolfe |
| 4,907,680 A | 3/1990 | Wolfe et al. |
| 4,921,272 A | 5/1990 | Ivers |
| 5,004,079 A | 4/1991 | Ivers et al. |
| 5,018,606 A | 5/1991 | Carlson |
| 5,046,594 A | 9/1991 | Kakinuma |
| 5,206,555 A | 4/1993 | Morris et al. |
| 5,207,774 A | 5/1993 | Wolfe et al. |
| 5,277,281 A | 1/1994 | Carlson et al. |
| 5,284,330 A | 2/1994 | Carlson et al. |
| 5,440,183 A | 8/1995 | Denne |
| 5,522,481 A * | 6/1996 | Watanabe ................... 288/267 |
| 5,560,464 A | 10/1996 | Gonda et al. |
| 5,576,500 A | 11/1996 | Cage et al. |
| 5,588,509 A * | 12/1996 | Weitzenhof et al. ........ 188/267 |
| 5,590,745 A * | 1/1997 | Rensel et al. ............... 188/267 |
| 5,996,973 A | 12/1999 | Campbell |
| 6,053,291 A * | 4/2000 | Shibahata et al. .......... 188/271 |

* cited by examiner

Primary Examiner—Christopher P. Schwartz
Assistant Examiner—Melanie Torres
(74) Attorney, Agent, or Firm—Michael M. Gnibus

(57) ABSTRACT

A magnetically actuated motion control device includes a housing defining a cavity and including a slot therethrough. A movable member is located within the cavity and is movable relative to the housing. A magnetic field generator located on either the housing or the movable member causes the housing to press against the movable member to develop a friction force.

67 Claims, 19 Drawing Sheets

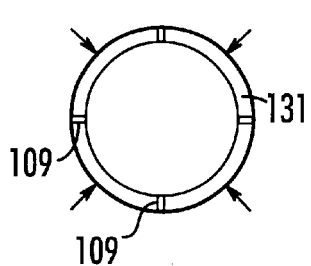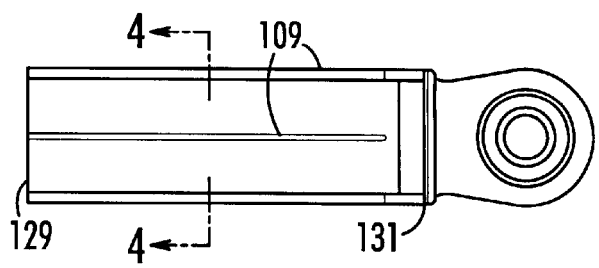
FIG. 4B    FIG. 4A
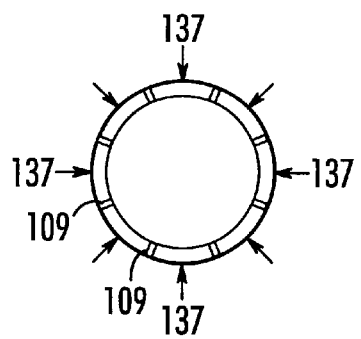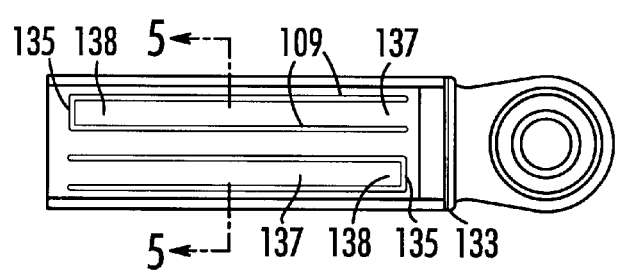
FIG. 5B    FIG. 5A
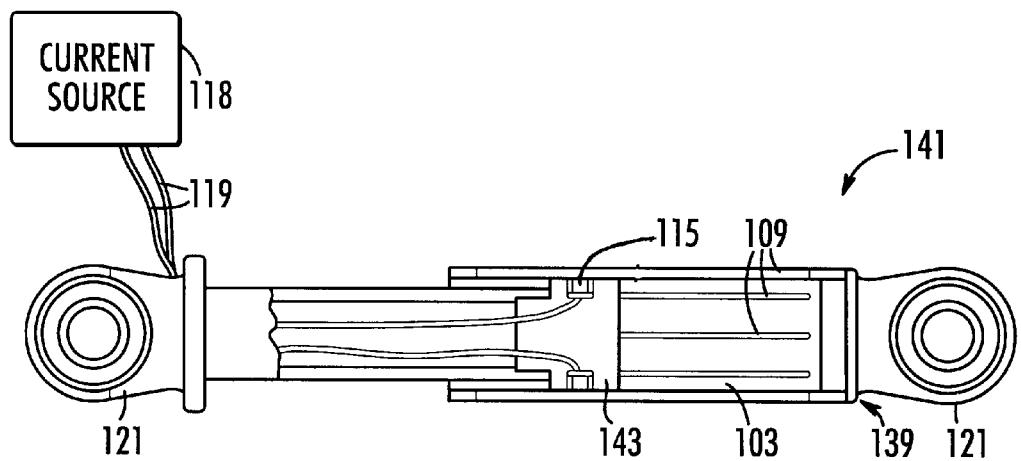
FIG. 6

FIG. 13
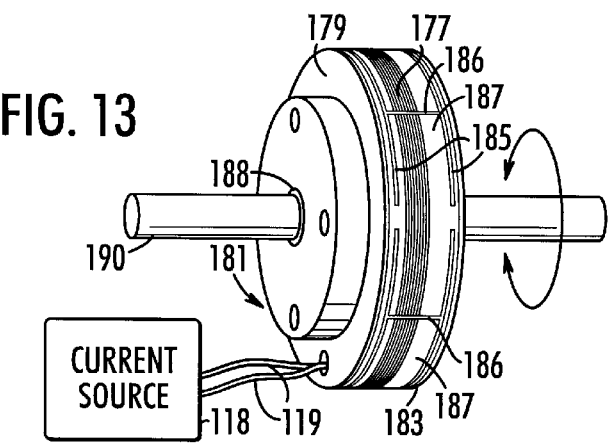
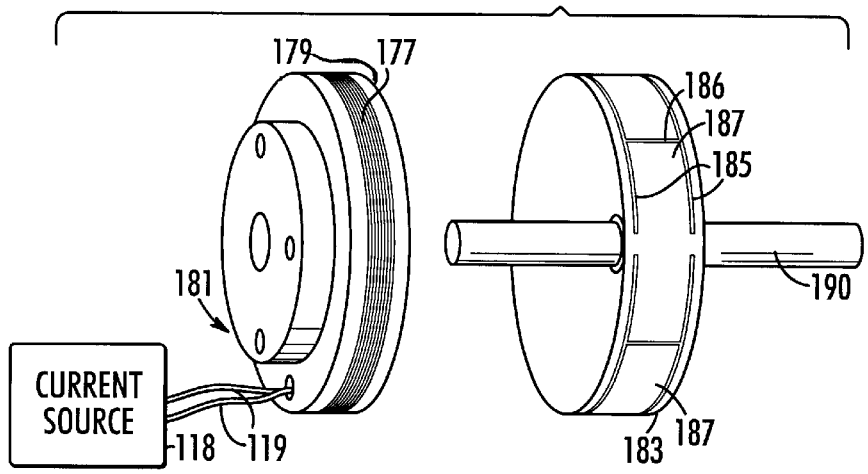
FIG. 14
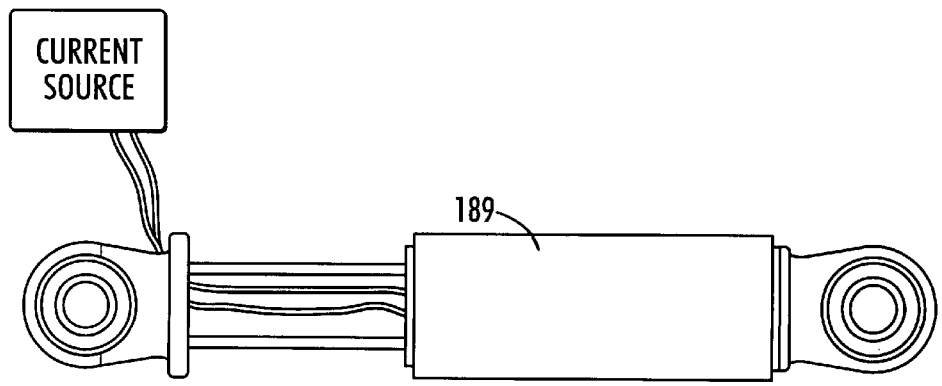
FIG. 15

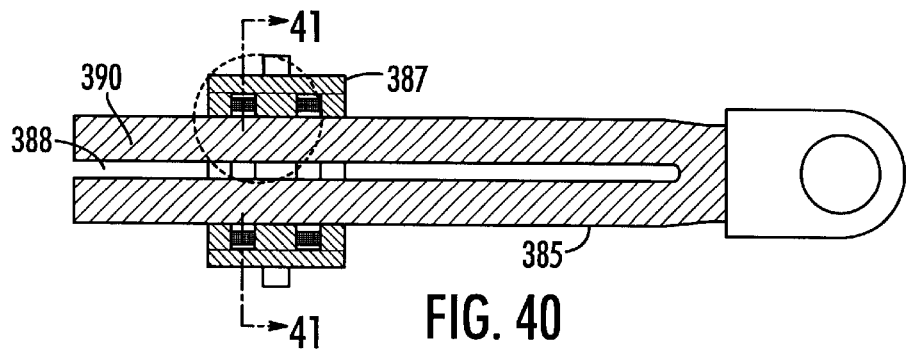
FIG. 40
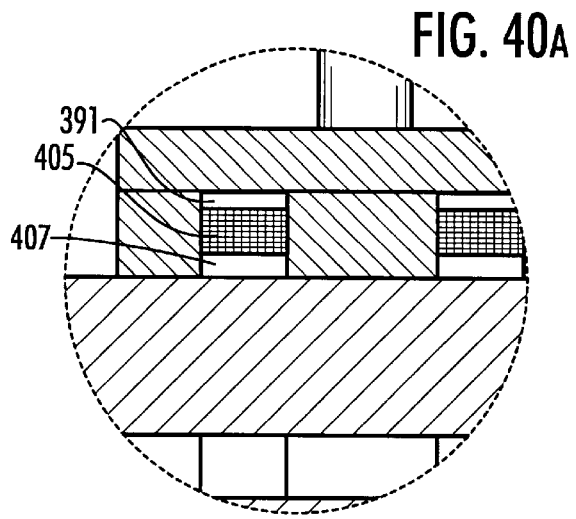
FIG. 40A
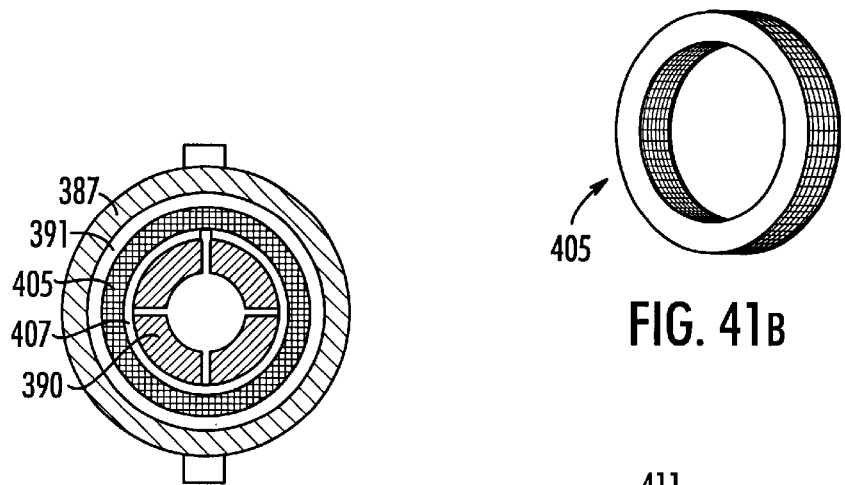
FIG. 41A
FIG. 41B
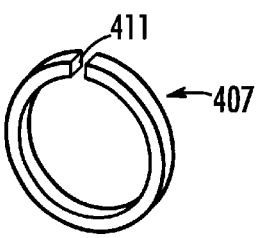
FIG. 41C

MAGNETICALLY ACTUATED MOTION CONTROL DEVICE

FIELD OF THE INVENTION

The present invention relates to magnetically actuated motion control device. In particular the present invention relates to magnetically actuated motion control devices that vary contact pressure between a first member and a second member in accordance with a generated magnetic field.

BACKGROUND AND RELATED ART

Magnetically actuated motion control devices such as magnetically controlled dampers or struts provide motion control, e.g., damping that is controlled by the magnitude of an applied magnetic field. Much of the work in the area of magnetically controlled dampers has focused on either electrorheological (ER) or magnetorheological (MR) dampers. The principle underlying both of these typos of damping devices is that particular fluids change viscosity in proportion to an applied electric or magnetic field. Thus, the damping force achievable with the fluid can be controlled by controlling the applied field. Examples of ER and MR dampers are discussed in U.S. Pat. Nos. 5,018,606 and 5,384,330, respectively.

MR fluids have high yield strengths and viscosities, and therefore are capable of generating greater damping forces than ER fluids. In addition, MR fluids are activated by easily produced magnetic fields with simple low voltage electromagnetic coils. As a result, dampers employing MR fluids have become preferred over ER dampers.

Because ER and MR fluid dampers still involve fluid damping, the dampers must be manufactured with precise valving and seals. In particular, such dampers typically require a dynamic seal and a compliant containment member which are not particularly easy to manufacture and assemble. Further, the fluid type dampers can have significant "off-state" forces which can further complicate manufacture and assembly. Off-state forces refer to those forces at work in the damper when the damper is not energized.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE DISCLOSURE

According to one aspect of the invention, a magnetically actuated motion control device is provided. The magnetically actuated motion control device includes a housing, and movable member and a magnetic field generator located on either the housing or the movable member. The housing defines a cavity in which the movable member is located and includes at least one slot. A magnetic field applied by the field generator causes the housing to press against the movable member and thereby provide friction damping.

According to another aspect of the invention, a sensor for sensing the position of a movable member relative to a housing of a magnetically controlled damper is provided. The sensor includes a first member secured to the housing, a second member, such as a slide, that is coupled to the movable member so that the relative position of the first member and the second member relates the position of the movable member within the housing. According to an exemplary embodiment, the movable member can include a depression for receiving an extension on the second member of the sensor. The extension of the second member fits through a slot in the housing and into the depression to couple the second member of the sensor to the movable member. In another embodiment, the second portion of the sensor can be configured so as to be in rolling contact with the movable member. In this embodiment, relative rotation between the first member and the second member indicates relative motion between the movable member and the housing.

The foregoing and other aspects will become apparent from the following detailed description of the invention when considered in conjunction with the accompanying drawing figures.

BRIEF DESCRIPTION OF THE DRAWINGS

The objects and advantages of the invention will be understood by reading the following detailed description in conjunction with the drawings in which:

FIG. 4A is a side view of a housing according to a third exemplary embodiment of the present invention;

FIG. 4B is an end sectional view taken along section 4—4 in FIG. 4A;

FIG. 5A is a side view of a housing according to a fourth exemplary embodiment of the present invention;

FIG. 5B is an end sectional view taken along section 5—5 in FIG. 5A;

FIG. 6 is a cutaway side sectional view of a fifth exemplary embodiment of the present invention;

FIG. 13 is a perspective view of a tenth exemplary embodiment of the present invention;

FIG. 14 is a perspective exploded view of the embodiment shown in FIG. 13;

FIG. 15 is a side view of an embodiment of the present invention including an outer layer of acoustically insulating material;

FIG. 40 is a side sectional view of the embodiment shown in FIG. 39 in an on-state;

FIG. 40A is a partial view of the housing of FIG. 40;

FIG. 41A is a sectional view taken along section 41—41 in FIG. 40;

FIG. 41B is a perspective view of a spring in the embodiment shown in FIG. 41A;

FIG. 41C is a perspective view of a bearing in the embodiment shown in FIG. 41A;

DETAILED DESCRIPTION OF THE EXEMPLARY EMBODIMENTS

Figure 1:
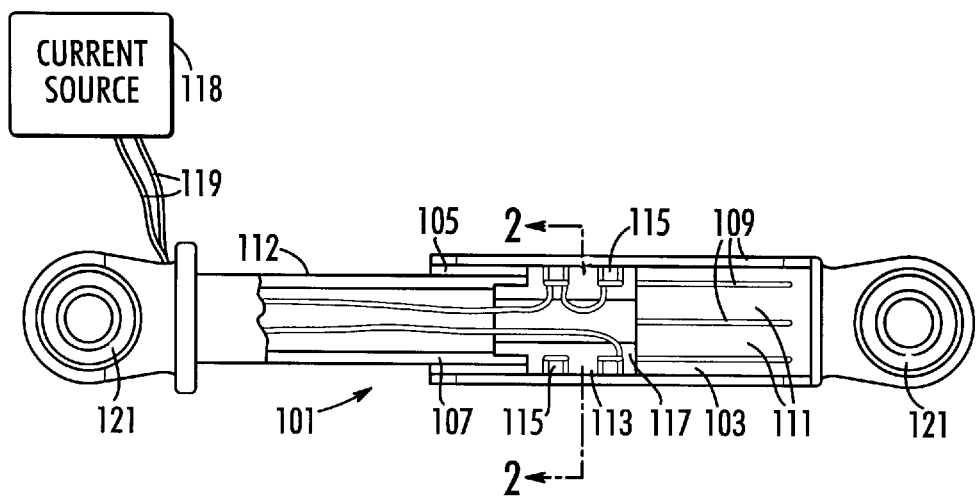
FIG. 1 is a cutaway side sectional view of a first exemplary embodiment of the present invention.

For a better understanding of the invention, the following detailed description refers to the accompanying drawings, wherein exemplary embodiments of the present invention are illustrated and described.

The present invention relates to a magnetically actuated alternative to traditional MR fluid motion control devices. A magnetically actuated motion control device according to the present invention can be embodied as linear or rotary dampers, brakes, lockable struts or position holding devices. The invention contains no MR fluid, yet provides a variable level of coulombic or friction damping that is controlled by the magnitude of the applied magnetic field.

In contrast to MR or ER fluid devices, a magnetically actuated motion control device according to the present invention is simple to manufacture and relatively low cost. A magnetically actuated motion control device according to the present invention also allows for very loose mechanical tolerances and fit between components. In addition, a magnetically actuated motion control device according to the present invention does not require a dynamic seal or a compliant containment member as does a fluid type damper, and is therefore relatively easy to manufacture and assemble. Further, a magnetically actuated motion control device according to the present invention has particularly low off-state forces which provide for a wide dynamic range between the off-state and a maximum damping force.

An example of a magnetically actuated motion control device according to the present invention includes a magnetically permeable tubular housing that moves relative to an electromagnetic piston and includes one or more coils, an associated magnetically permeable core or core pieces and associated pole regions. Although the housing in this example is tubular, a housing can be of any suitable cross section, including, but not limited to a rectangular cross section. The pole regions are located near an interface between the piston and the housing and carry magnetic flux in a generally radial direction with respect to a longitudinal axis running along the housing. The housing includes at least one slot but typically includes an array of slots. The housing slots allow the housing to flex and constrict radially when a magnetic field is applied by directing current through the coils. In so doing, the inner surface of the housing squeezes against the outer surface of the piston with a normal force that is approximately proportional to the magnitude of the applied magnetic field. Thus, the housing acts like a magnetically actuated collet that squeezes the piston to resist relative movement between the housing and the piston. Generally, the magnitude of the applied magnetic field is proportional to the electric current supplied to the coil. The damping force thus depends on the coefficient of friction between the inner surface of the housing and the outer surface of the piston and the normal force between these surfaces, which is dependent on the magnetic field produced by running current through the coils.

The invention allows for the accommodation of very loose mechanical tolerances or fit between the housing and the piston. Because the present invention does not require a dynamic seal or compliant containment member, it offers particularly low off-state forces and is simple to manufacture and assemble.

The present invention is particularly suitable for making low-cost, high-volume linear dampers for use in household appliances such as washing machines. Other applications for magnetically actuated motion control devices according to the present invention include simple rotary or linear brakes for controlling mechanical motions inside office equipment such as copiers or printers, e.g., paper feed mechanisms. Additional applications for magnetically actuated motion control devices according to the present invention include dampers for use as semi-active control elements in conjunction with ultra-low vibration tables and platforms. Magnetically actuated motion control devices according to the present invention can also be used as latching or locking mechanisms in office furniture, e.g., props and latches for doors, drawers, etc. Still other applications include exercise equipment, rehabilitation equipment, joysticks, seismic structural control dampers, avionics semi-active control devices, machine tool fixturing devices, ventilation system flaps and doors in automobiles, and sliding doors in vehicles, etc.

Magnetically actuated motion control devices according to the present invention can also be used in the area of haptics. The field of haptics includes devices used in computer peripherals such as force-feedback steering wheels, programable detents, computer pointing devices and joysticks used with games and other software. This field also includes industrial force feedback mechanisms such as steering wheels on steer-by-wire vehicles.

Yet another application is to use either linear or rotary embodiments of the invention in conjunction with pneumatic and hydraulic actuators to enable precision position and velocity control.

Figure 2:
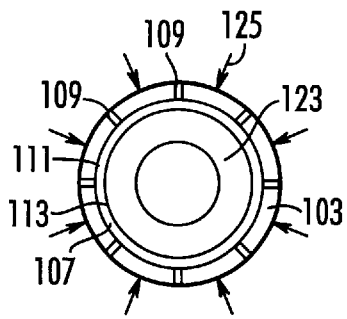
FIG. 2 is an end sectional view taken along section 2—2 in FIG. 1.

Turning to the drawings, a first exemplary embodiment of a magnetically actuated motion control device according to the present invention is shown in FIGS. 1 and 2. The first embodiment motion control device is a damper 101 and includes a housing 103 defining a cavity 105 in which a piston 107 is located. The housing 103 includes a least one longitudinal slot 109 (five of eight such slots can be seen in FIG. 1). The housing shown in FIG. 1 includes a plurality of slots that pass through the housing wall to define flexible bands, tabs, or fingers 111. The slots 109 extend through the wall of the housing 103 and extend nearly the entire length of the housing 103. Although narrow slots are illustrated in the Figures, it should be understood that a suitable wide slot could also be provided in the housing.

The piston 107 includes a shaft 112 having a magnetically active portion 113 made up of at least one, and preferably two electromagnetic coils 115 set in a magnetically permeable core 117. Although here the magnetically permeable core 117 is hollow, the core can alternatively be a solid bobbin. A hollow core allows space for connecting wires or for an axial screw or rivet. However, a solid core is preferable because magnetic saturation of the core is reduced.

In addition, the core can be made up of a plurality of core pieces. A current source 118 supplies current to the coils 115 through wires 119. Each end of the damper preferably includes a structure which facilitates attaching damper 101 to other structures, such as clevis eye 121 for attaching the end to a portion of a damped component.

Current flowing through the coils 115 creates a magnetic field that draws the housing 103 in toward the piston 107. For this purpose, the housing 103 is formed of a material which will be attracted by the magnetic field. Examples include, but are not limited to, steels and other iron alloys. The amount of current flowing through the coils 115 is generally directly proportional to the magnitude of the magnetic field generated. Thus, control of the electric current flowing through the coils 115 can be used to control the normal or pressing force between the inner surface of the housing 103 and the outer surface of the piston 107, thereby controlling the damping effect of the damper 101.

An illustration of the damping effect can be seen in the end sectional view shown in FIG. 2, which shows the relationship of the slotted housing 103 with respect to the piston 107. When no magnetic field is applied, the piston 107, and particularly the active portion 113, fits loosely within the housing 103 to define a small radial clearance 123 between the housing 103 and the magnetically active portion 113 of the piston 107. That is, the housing 103 is relaxed and does not press against the piston 107. When current is supplied to the coils 115 the magnetic field generated causes the flexible fingers 111 in the housing 103 to be attracted radially inward as indicated by the arrows 125 such that the housing 103 squeezes the piston 107 with a force proportional to the applied magnetic field, and therefore the applied current.

The slotted housing 103 and the core 117 of the piston 107 are preferably made from low carbon, high permeability steel, although other magnetically permeable materials can be used. The slots 109 are preferably evenly spaced around the circumference of the housing 103 so that axial-periodic symmetry is maintained. The pair of coils 115 is preferably wired such that they produce magnetic fields in opposite directions. This configuration allows the magnetic field produced by each coil 115 to add rather than cancel in an area between the coils 115.

Figure 3B:
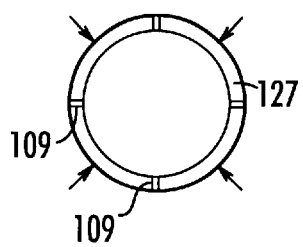
FIG. 3B is an end sectional view taken along section 3—3 in FIG. 3A.
Figure 3A:
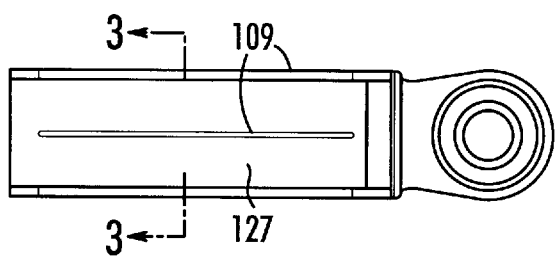
FIG. 3A is a side view of a housing according to a second exemplary embodiment of the present invention.

The configuration of the slots in the housing of the damper can be varied to tune the flexibility of a housing. FIGS. 3A and 3B illustrate a housing 127 that includes fewer longitudinal slots 109, and therefore has less flexibility than a comparable housing having a larger number of slots. Longitudinal slots 109 may also be carried through to an open end 129 of a housing 131 as shown in FIGS. 4A and 4B. Slots 109 carried through to the end 129 create a flexible housing 131 which promotes full contact between the housing 131 and the piston when the magnetic field is applied. Such a slot configuration may be particularly useful when the housing 131 is made from a thick-wall tubing. Greater housing flexibility can also be obtained by connecting pairs of slots 109 in a housing 133 with a cross-slot 135 to form flexible fingers 137 having free ends 138 as shown in FIGS. 5A and 5B.

Figure 7:
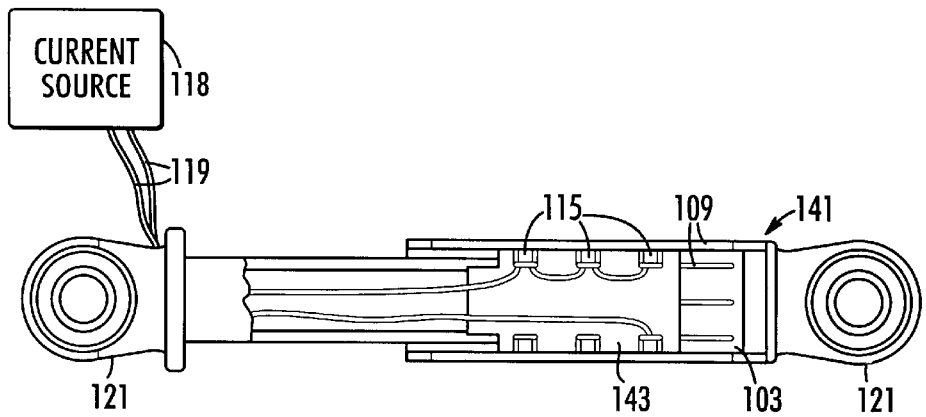
FIG. 7 is a cutaway sectional view of a sixth exemplary embodiment according to the present invention.

Depending on the thickness of the housing material and its consequent ability to carry magnetic flux (permeability), and also on the magnitude of the desired damping force, the number of coils 115 can vary from the embodiment shown in FIGS. 1 and 2. For example, a single-coil embodiment 139 is shown in FIG. 6 and a 4-coil embodiment 141 is shown in FIG. 7. Except for the number of coils 115, and a solid core 143 rather than the hollow core described above, the embodiments shown in FIGS. 6 and 7 are identical to the embodiment shown in FIGS. 1 and 2. More coils 115 are preferable when the thickness of the housing is small in order to avoid magnetic saturation of the housing. Magnetic saturation refers to the maximum amount of magnetization a material can attain, as will be readily appreciated by one of ordinary skill in the art. The thickness of the housing limits the amount of magnetization that can be induced in the portion of the housing adjacent to the coils.

In some applications of the invention it is desirable to have the magnetic field, and therefore the damping force, applied most of the time with only short instances of turning the damping off. This can be accomplished by adding one or more permanent magnets to the system. A permanent magnet can be used in the damper so that the damper is in its on-state and the housing pressing against the piston when no current is applied to the electromagnetic coil. The electromagnetic coil serves to cancel the field of the permanent magnet as current is applied to progressively turn the damper off.

Figure 8:
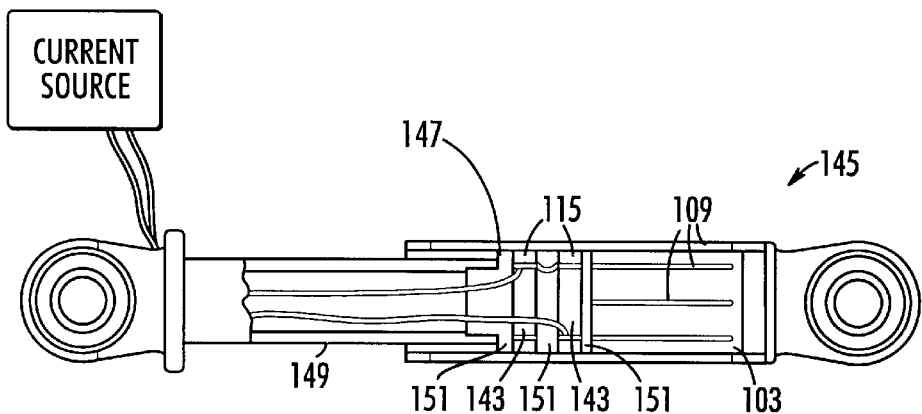
FIG. 8 is a cutaway side sectional view of a seventh exemplary embodiment according to the present invention.

A seventh exemplary embodiment of the motion control device of the present invention is illustrated in FIG. 8. As seen in FIG. 8, two axially polarized (i.e., the opposite faces of the disks are the opposite poles of the magnets) disk magnets 143 are positioned and oriented to bias a damper 145 into an on-state, i.e., a condition in which the housing is magnetically attracted to the piston. A magnetically active portion 147 of a piston 149 includes three core pieces 151 between which the disk magnets 143 are located. The disk magnets 143 are located immediately radially inward of the coils 115. The disk magnets 143 pull the housing 103 and the piston 149 together. In order to turn the damping off, the magnetic fields produced by the permanent disk magnets 143 are at least in part, and preferably completely canceled by applying current to the pair of coils 115, which each generate magnetic fields that oppose those of the permanent magnets 143.

Figure 9:
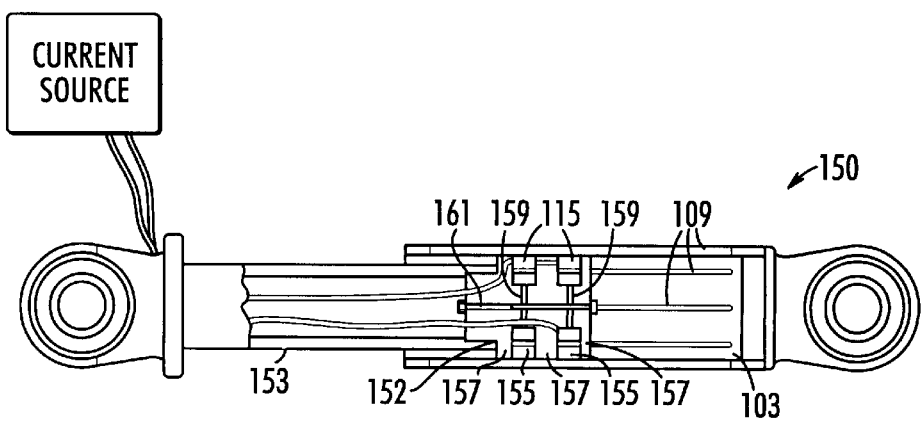
FIG. 9 is a side cutaway sectional view of a eighth exemplary embodiment of the present invention.

An eighth exemplary embodiment of the motion control device of the present invention is illustrated in FIG. 9. In this case the electromagnets do not cancel the magnetic field in all directions. Rather, the electromagnets cause the field of the permanent magnet to be redirected to a different path.

Like the embodiment shown in FIG. 8, the embodiment of a damper 150 according to the present invention shown in FIG. 9 includes the housing 103 having the same structure as that shown in FIGS. 1 and 2. According to the embodiment shown in FIG. 9, a magnetically active portion 152 of a piston 153 includes axially-polarized permanent ring magnets 155 located immediately radially inward of the coils 115. The coils and ring magnets are located between magnetically permeable core pieces 157 so as to define non-magnetic gaps 159 in the center of each ring magnet 155. Gaps 159 are less magnetically permeable than core pieces 157, and therefore cause less magnetic flux through the center of the magnetically active portion 152. The core pieces 157 and ring magnets 155 are held together by a non-magnetic connector 161. The connector 161 is non-magnetic to prevent the generated magnetic field from being shunted away from the interface between the housing 103 and the magnetically active portion 152. Alternatively, the core pieces 157 can be held together by an adhesive. Any suitable adhesive can be used, including but not limited to epoxys and cyanoacrylates.

Figure 10A:
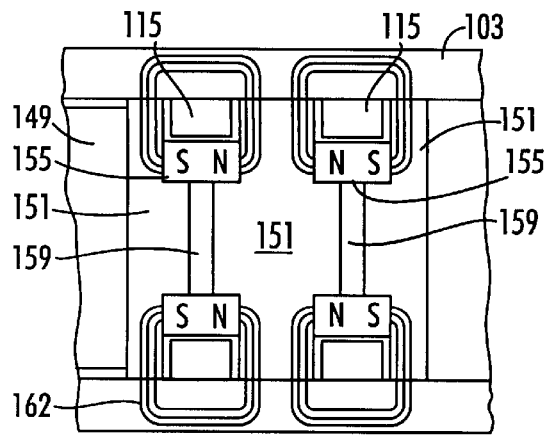
FIG. 10A is a schematic diagram illustrating the magnetic field produced by permanent magnets in a damper according to the eighth exemplary embodiment.
Figure 10B:
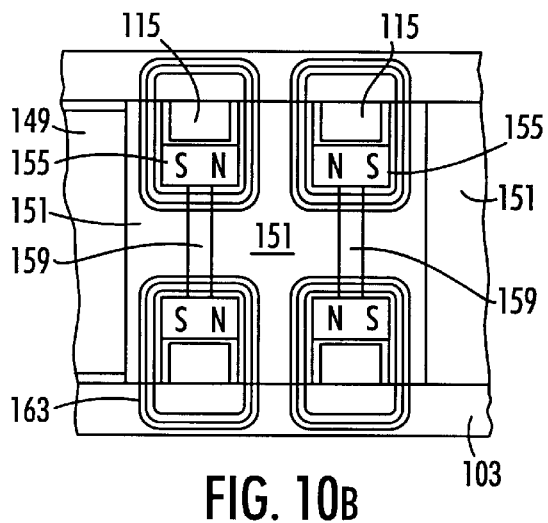
FIG. 10B is a schematic diagram of the magnetic field produced by coils in a damper according to the eighth exemplary embodiment.
Figure 10C:
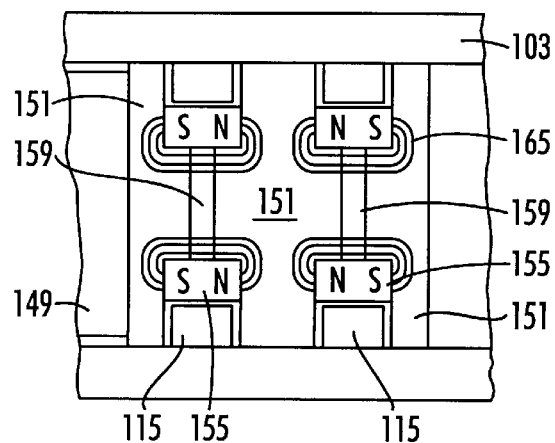
FIG. 10C is a schematic diagram of the magnetic field resulting from the addition of the magnetic fields shown in FIGS. 10A and 10B.

As is schematically shown in FIG. 10A, the non-magnetic gaps 159 at the center of the ring magnets 155 allow very little magnetic flux to follow flanking paths through the non-magnetic gaps 159 at the center of the ring magnets 155. As a result, a magnetic field 162 through the housing 103 has a much lower reluctance (resistance to carrying a magnetic field) than the flux path through the center of each of the ring magnets 155 and therefore radially draws the housing 103 and the piston 149 together, as described above. In order to reduce the damping force, current is applied to the electromagnetic coils 115 which produce a magnetic field 163, as schematically shown in FIG. 10B. The current can be adjusted such that the magnitude of the field produced by the coils is equal to, but opposite, that of the ring magnets 155 where the field paths cross into the housing 103. The magnetic field 163 adds to that produced by the ring magnets 155 to yield a net magnetic field 165 shown in FIG. 10C. That is, the magnetic field of each of the permanent ring magnets 155 is redirected to flow through the high reluctance path through the open center of the ring magnets 155. The magnetic field at the interface between the housing 103 and the piston that produces the attraction between the housing 103 and the piston 149 is canceled, and hence the damping force of the damper is reduced or entirely canceled.

Figure 11:
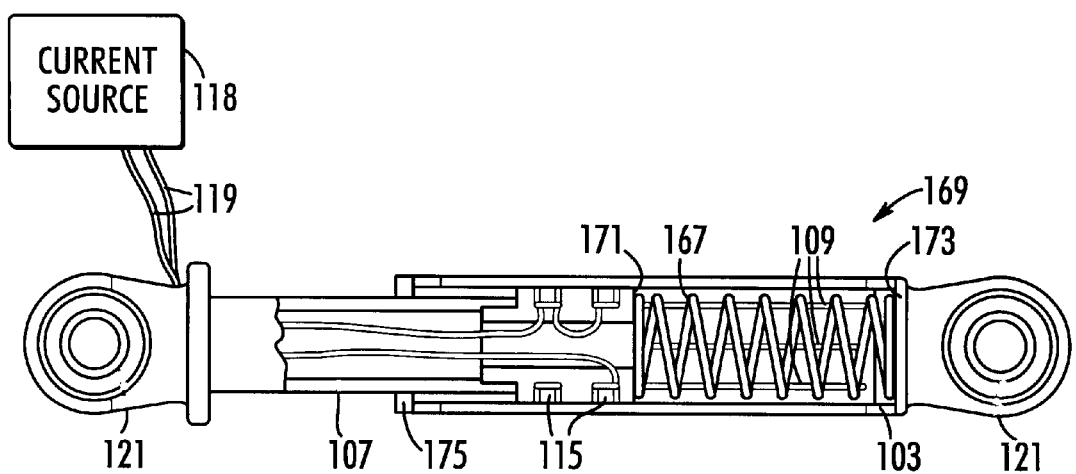
FIG. 11 is a cutaway side sectional view of a ninth exemplary embodiment of the present invention.

A ninth exemplary embodiment of the motion control device of the present invention is illustrated in FIG. 11. As shown in FIG. 11, a spring 167 can be added to an end of a damper according to the present invention to form a strut 169. The damper shown in FIG. 11 is identical in structure to that shown in FIGS. 1 and 2, except that the spring 167 is provided between the end 171 of the piston 107 and closed end 173 of the housing 103. In a mechanical system the strut 169 provides the desired spring stiffness in addition to a controllable level of damping force. In addition, as schematically shown in FIG. 11, a mechanical stop 175 is added to the end of the housing 103 to hold the piston 107 in the housing 103 and allow the spring 167 to be preloaded. The mechanical stop 175 can optionally be included with damper embodiments as well.

Figure 12:
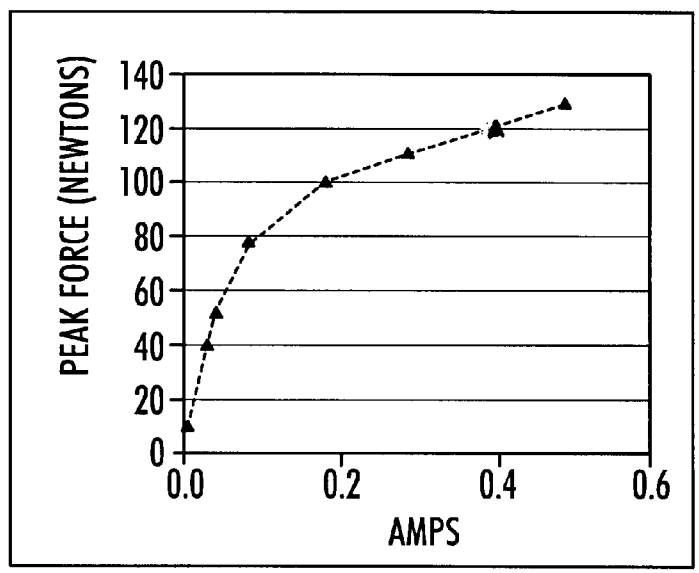
FIG. 12 is a graph showing the relationship between damping force and current for a damper constructed in accordance with the present invention.

Measured performance of a damper constructed according to the present invention is shown in the graph comprising FIG. 12. For purposes of plotting the performance graph, the damper housing was constructed from low-carbon steel tubing having a 1.125 inch (28.58 mm) outer diameter and 1.000 inch (25.40 mm) inner diameter. The steel part of the housing was 5.0 inches (127 mm) long. Four lengthwise slits each approximately 0.040 inches (1 mm) wide 4.25 inches (108 mm) long were formed in the housing. The piston included two coils wound onto a low carbon steel double bobbin having an overall length of 1.0 inches (25.4 mm). The diameter of the steel poles of the piston was 0.990 inches (25.15 mm). The axial length of the two outer pole sections were each 0.145 inches (3.68 mm). The center pole section was 0.290 inches (7.37 mm) long. The diameter of the solid center core of the piston was 0.689 inches (17.5 mm ). The two coils were each wound with 350 turns of 35 AWG magnet wire and were connected in series. The total resistance of the two coils was approximately 48 ohms. The total usable stroke of the damper was about 3 inches (76 mm).

Turning now to the graph, initially, at low current, the example damper displays a proportionate, nearly linear behavior which then rolls off as magnetic saturation effects begin to dominate as can be seen in FIG. 12. The damping force that is produced is almost perfectly coulombic with little or no velocity dependence. That is, the damping force is almost directly dependent on the current supplied to the coils. The data shown are peak forces obtained with the damper undergoing sinusoidal excitation with a ±0.5 inches (12.7 mm) amplitude and a peak speed of 4 inches/sec (102 mm/s). A curve obtained with a peak speed of 1 inch/sec (25.4 mm/sec) appeared to be nearly identical.

Although axial motion of the piston relative to the housing is what has been discussed thus far, a damper according to the present invention will also function as a rotary damper with the piston rotating relative to the housing.

A tenth exemplary embodiment of the motion control device of the present invention is illustrated in FIGS. 13 and 14. FIG. 13 shows an assembled example of a rotational embodiment according to the present invention, with portions broken away to show some interior elements. FIG. 14 shows the embodiment shown in FIG. 13 partially disassembled. In this embodiment a coil 177 wound around a center steel bobbin 179 form a stator 181. The stator 181 is positioned within a cavity defined by, and for rotation relative to, a slotted housing 183. Slots 185 are connected by cross-slots 186 to define fingers 187, which impart a high degree of flexibility to the housing 183. The highly flexible housing 183 allows maximum contact between the stator 181 and the housing 183 when the magnetic field is energized. Bearings 188 are included in the stator 181 to support a shaft 190 with which the housing 183 rotates.

A damper according to the present invention generates strong coulombic pressing forces when the outer surface of the magnetically active portion of the piston or stator makes direct contact with the inner surface of the steel housing. In fact, the inventor herein has found that damper performance actually improves after being initially operated due to an apparent "wearing-in" process. During the wearing-in process friction between the surfaces of the housing and the piston causes some wear to occur which effectively laps or burnishes the contacting surfaces such that "high spots" (large surface features) are removed and the housing and piston (or stator) contact more intimately. This improves the efficiency of the magnetic circuit and increases total contact surface area so that the overall damping force is increased.

In some applications of the present invention, it is desirable to place a layer of damping material or acoustic foam 189 around the outside of the housing as seen on the exemplary damper shown in FIG. 15. The components of the damper shown in FIG. 15 are identical to the exemplary dampers discussed with respect to FIGS. 1–14. Such an acoustically insulating material will serve to attenuate any high frequency squeaking, rubbing or clanking sounds that may occur due to a metal housing moving against a metal piston. The desirability of such added acoustic material depends on a number of factors, including: the actual thickness of the housing; the resonant characteristics of the housing; the looseness of the fit between the housing and the piston, the alignment of the parts during application of the damper; and the presence of elastomeric bushings in the clevis eyes used to mount the damper. Lubricant (grease or oil) can also be added so that the parts of the damper slide smoothly relative to each other in the off-state. Suitable acoustic material will be readily apparent to one of ordinary skill in the art.

A similar quieting effect can be achieved by adding an intermediary friction increasing layer to the rubbing surfaces of the piston or stator, or the inner surfaces of the housing. Examples of such materials may be a thin polymeric layer such as polyethylene or nylon, or a composite friction material such as that typically used in vehicle clutches and brakes. Such a friction layer eliminates metal to metal contact and reduces long term wear. However, the presence of such layer of friction material will in general make the magnetic circuit less efficient. Unless the friction material has a high permeability like low carbon steel it increases the reluctance of the magnetic circuit dramatically and lowers the amount of damping force when the damper is in the on-state.

According to yet another embodiment of the present invention, a magnetically controlled damper can further include an integrated position sensor. Exemplary embodiments of a damper including a position sensor according to the present invention are shown in FIGS. 16–23. Preferably, a magnetic friction damper 191 includes sensor 193, such as a linear potentiometer, including a first portion 194 and a slider 196. The first portion is attached to the housing 103 by brackets 198. The slider 196 is coupled to the damper piston 195 by a small engagement pin 197 that passes through one of a plurality of slots 109 in the housing 103 of the magnetic friction damper 191.

Figure 16:
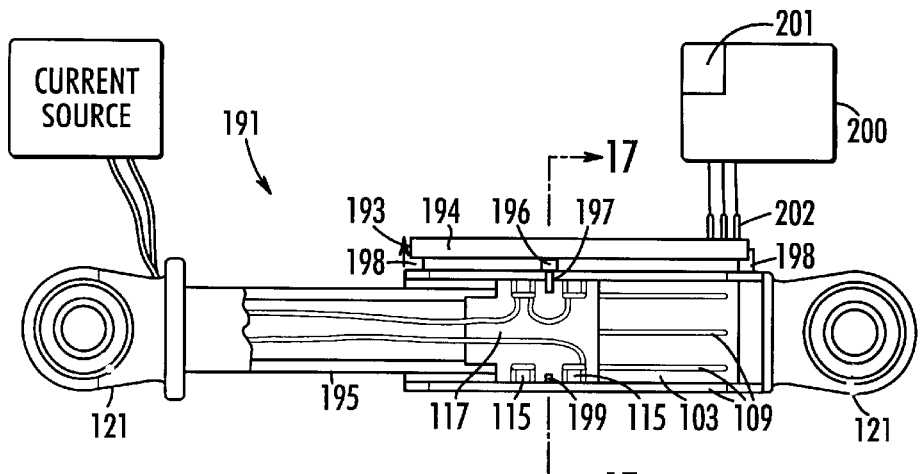
FIG. 16 is a cutaway side sectional view of an eleventh embodiment of the present invention.
Figure 17:
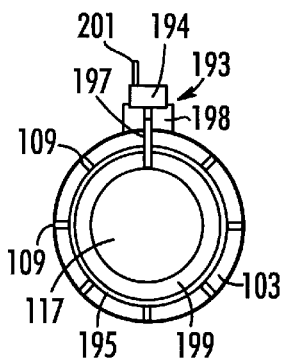
FIG. 17 is an end sectional view taken along section 17—17 in FIG. 16.
Figure 18:
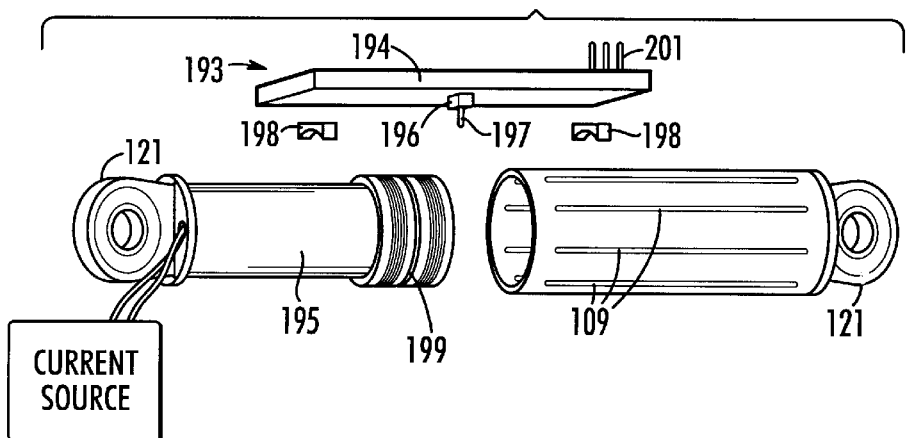
FIG. 18 is an exploded perspective view of the embodiment shown in FIGS. 16 and 17.

A eleventh exemplary embodiment of the motion control device of the present invention is illustrated in FIGS. 16–18. FIGS. 16–18 show a damper similar to the damper shown in FIGS. 1 and 2. Otherwise identical to the piston shown in FIGS. 1 and 2, the piston 195 includes a circumferential groove 199 between electromagnetic coils 115. The sensor 193 is mounted along the side of the damper housing with brackets 198 such that an extension, such as the pin 197 of the slider 196 on the potentiometer 193, can pass through one of the longitudinal slots 109 in the damper housing 103. The groove 199 in the damper piston 195 accepts the pin 197 and causes the slider 196 to move longitudinally in concert with the piston 195 while permitting relative rotational movement between the piston and the housing. Thus, for example, electrical resistance of a potentiometer varies in proportion to the piston displacement in the housing, thereby indicating the relative position of the housing 103 and the piston 195.

Alternatively or in addition to measuring linear displacement with the sensor 193, the sensor can be used to measure the relative velocity or acceleration of the housing 103 and the piston 195. Furthermore, sensor 193 can be a velocity sensor or an accelerometer, which are readily commercially available and with which one of ordinary skill in the art is well acquainted. A device for interpreting the signal from sensor 193, such as a general purpose computer 200 having a memory 201, is in electrical communication with electrical connections 202 on the sensor 193. Computer 200 can further be provided with logic in the memory 201 which can determine relative position, velocity, or acceleration based on the electrical signals sent by the sensor 193, and can store data representative of one or more of these parameters. Because one of ordinary skill in the art readily appreciates the details of the use of such a computer 200 and logic usable with sensor 193, further details will not be provided herein.

A circumferential groove 199 rather than a hole in the piston 195 is preferred because the circumferential groove 199 does not inhibit rotational motion of the piston 195. Allowing free rotational motion of the piston 195 relative to the housing 103 is important so that the clevis eyes 121 at the ends of the damper 191, when provided, can be easily properly aligned with the mounting pins in the components to which the damper 191 is attached so that the damper 191 does not bind during use.

Figure 19:
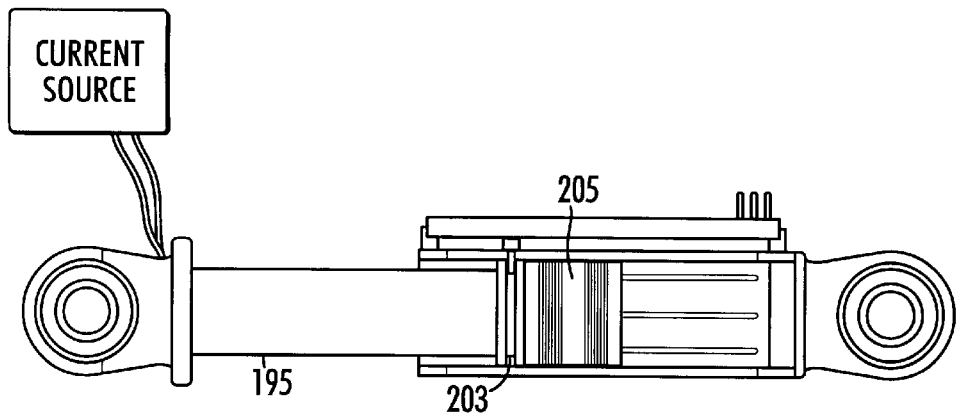
FIG. 19 is a cutaway side sectional view of a twelfth exemplary embodiment according to the present invention.
Figure 20:
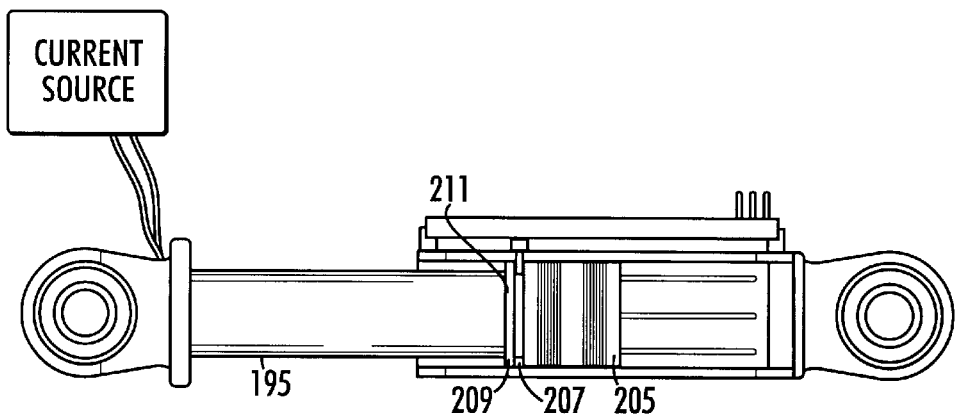
FIG. 20 is a cutaway side sectional view of a thirteenth exemplary embodiment according to the present invention.
Figure 21:
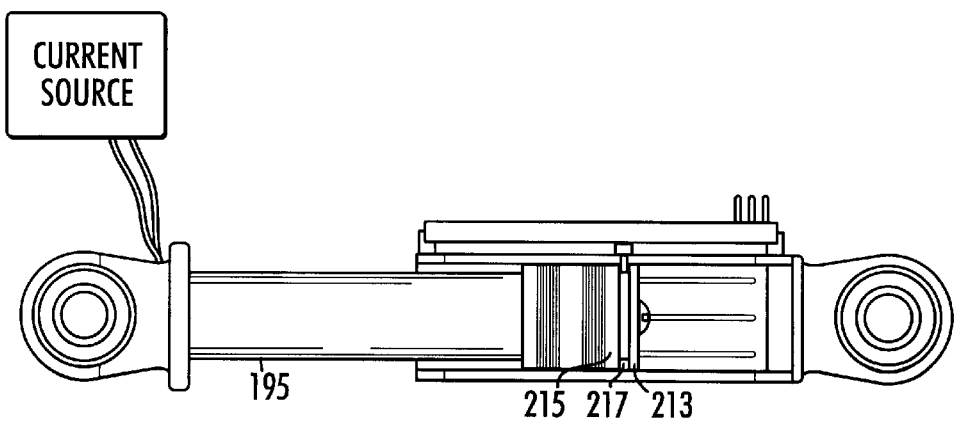
FIG. 21 is a cutaway side sectional view of a fourteenth exemplary embodiment according to the present invention.

Twelfth, thirteenth and fourteenth exemplary embodiments of the motion control device are illustrated in FIGS. 19, 20 and 21 respectively. As seen in FIGS. 19–21, a circumferential groove can be located on other parts of the piston 195 as well. For example, as seen in the embodiment shown in FIG. 19, a groove 203 is formed into the shaft of the piston 195 just behind a magnetically active portion 205 of the piston. In the embodiment shown in FIG. 20, a groove 207 is formed between a lip 209 formed into the piston 195 and a rear end 211 of the magnetically active portion 205 of the piston 195. In the embodiment shown in FIG. 21, a disk-shaped member 213 is attached to a free end 215 of the piston 195 to define a groove 217. Other than the arrangement of the circumferential groove the embodiments shown in FIGS. 19–21 are identical to the embodiment shown in FIGS. 16–18.

An experimental example of a damper including a position sensor was tested by the inventor herein. The prototype utilized a Panasonic potentiometer (part number EVA-JQLR15B 14, Matsushita Electric (Panasonic U.S.A.), New York, N.Y., U.S. distributers include DigiKey and Newark Electronics) with a working stroke of 3.94 inches (100 mm). Electrical resistance varied linearly from 0 to 10 Kohms. The potentiometer was mounted to the damper housing using hot-melt adhesive. The original rectangular extension on the slider was modified into the form of a small diameter pin to fit through one of the longitudinal slots in the magnetic friction damper housing. In the example, the groove in the piston was made by adding a small, spaced plastic disk to the end of an existing piston as shown in FIG. 21. The final result was an integrated variable resistance sensor whose output varied linearly with the position of the damper piston. Further, the pin and groove geometry allowed free rotational motion of the piston within the housing, a feature that allowed for proper alignment of the clevis eyes during damper installation and use.

Figure 22:
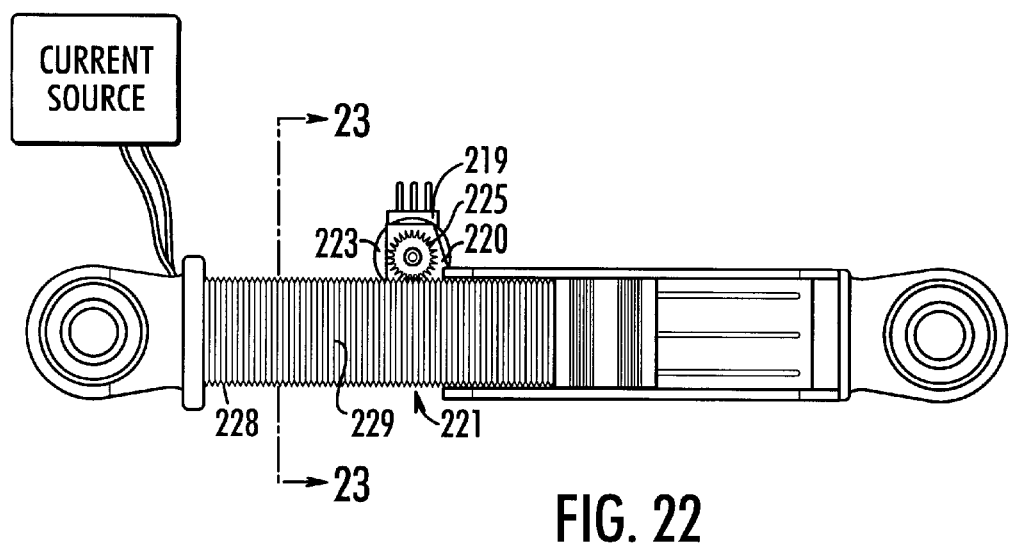
FIG. 22 is a cutaway side sectional view of a fifteenth exemplary embodiment according to the present invention.
Figure 23:
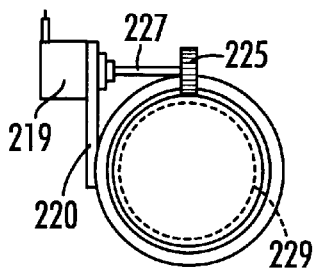
FIG. 23 is an end sectional view taken along section 23—23 in FIG. 22.

A fifteenth exemplary embodiment of the motion control device of the present invention is illustrated in FIGS. 22 and 23. Another exemplary embodiment of a damper including a position sensor is shown if FIGS. 22 and 23. In this embodiment a rotary sensor 219 (e.g., a rotary potentiometer) is used in the position sensor. Alternatively, a rotary optical encoder can be used in the position sensor. The rotary sensor 219 is mounted to the housing by a bracket 220 and is coupled to the motion of a piston 221 by means of the integrated rack and pinion system 223. A pinion gear 225 is coupled to the rotary sensor 219 (or optical encoder) by an axle 227. The piston 221 includes a shaft 228 that is molded (of, e.g., plastic) or otherwise formed to include a rack 229. It is preferable to allow relative rotation between the piston and the pinion gear. Therefore, it is preferable that the rack 229 is formed around the entire circumference of the piston 221.

In addition to the variable resistance sensors discussed above, other sensing devices may alternatively be used, including variable inductance or variable capacitance sensors, optical encoders, flex or bend sensors etc. and are all within the spirit and scope of the present invention. As discussed in reference to FIGS. 16–23 a sensor can be used to measure relative velocity or acceleration as well as relative position between a piston and a housing.

Further, although the magnetic damper including a position sensor has been described in the context of collet type dampers, the same position sensors may be included with MR or ER dampers. Examples of such MR or ER dampers are described in U.S. Pat. Nos. 5,284,330, 5,277,281 and 5,018,606, which are herein incorporated by reference in their entireties.

Figure 24:
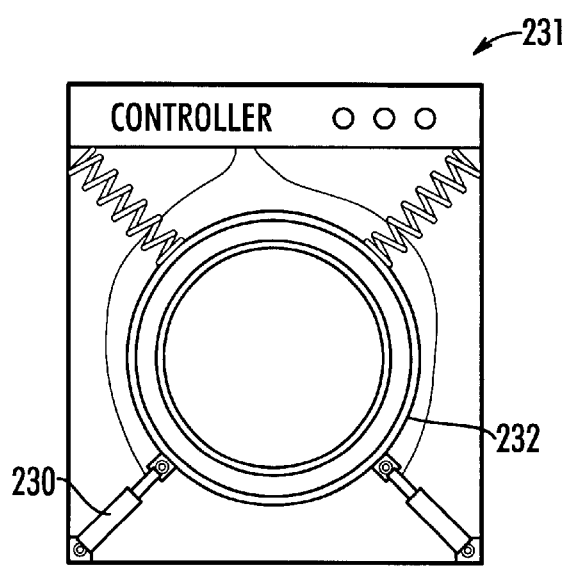
FIG. 24 is a schematic illustration of a washing machine employing an embodiment of the present invention.

Magnetically actuated motion control devices according to the present invention, including those described herein, are useful in many applications. FIGS. 24–32 illustrate a number of exemplary applications for the present invention device. For example, FIG. 24 shows the use of magnetically controllable dampers according to the present invention 230 in a washing machine 231. Magnetically controllable friction dampers can provide a high level of damping when the washing machine 231 passes during a resonance cycle and can be turned off during high speed spin to provide optimum isolation of the spinning basket or drum 232.

Figure 25:
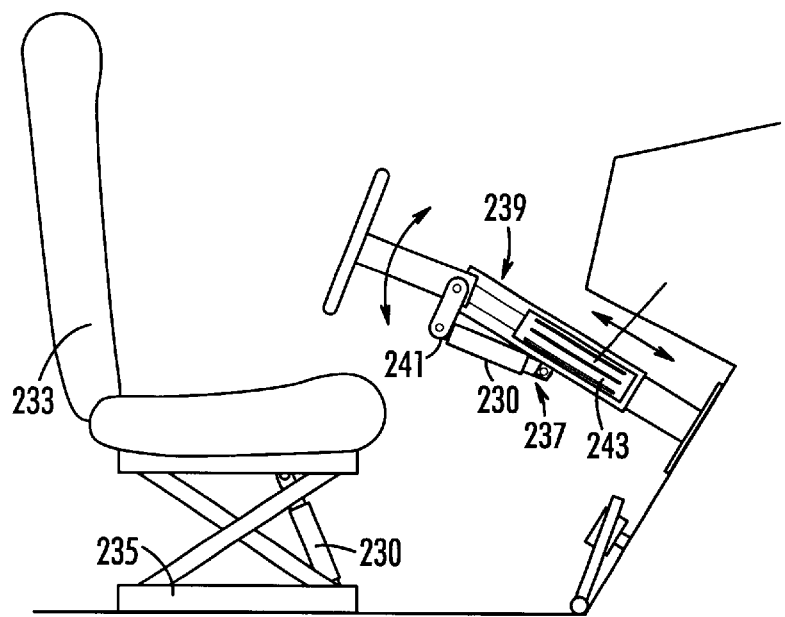
FIG. 25 is a schematic illustration of an embodiment of the present invention used in an automobile, truck, or other vehicle.

FIG. 25 shows several possible uses of the present invention in an automobile, truck, or other vehicle. Magnetically actuated motion control devices according to the present invention can be used as a semi-active seat suspension when located between a seat 233 and an associated base 235. Dampers according to the present invention can also be used as a locking element 237 in a steering column 239 including tilt and telescope mechanisms 241, 243. A magnetically actuated motion control device 230 in its on-state locks the steering column 239 in place. In its off-state, the damper allows the steering wheel to tilt and telescope into a desired position. Other applications in motor vehicles include the use of a damper as an interlock mechanism in gearshift mechanisms (not illustrated).

Figure 26A:
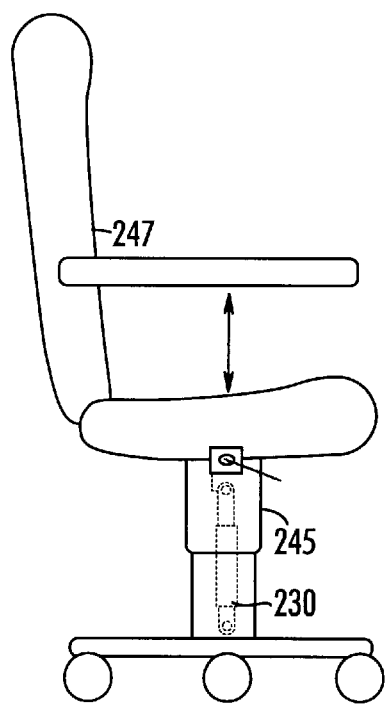
FIG. 26A is a schematic illustration of an embodiment of the present invention used as a damper in a chair.
Figure 26B:
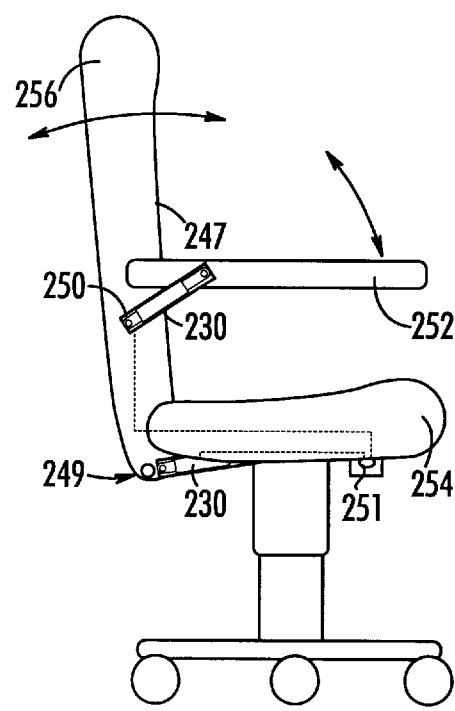
FIG. 26B is a schematic illustration of an embodiment of the present invention being used to control the tilt of the chair shown in FIG. 26A.

Another application for the invention is as a locking member 245 for various types of furniture such as office chairs, for example. FIG. 26A illustrates the use of a magnetically actuated motion control device 230 in a height adjustor 245 of an office chair 247. FIG. 26B illustrates the use of a magnetically actuated motion control device 230 as a locking mechanism 249 for the back tilt motion of the chair 247 and as a locking mechanism 250 for a height adjustable armrest 252 of the chair 247, and which can be connected between the armrest 252 and either a seat 254 or a backrest 256 of the chair 247. An electrical control 251 is used by an operator to selectively turn off the magnetically actuated motion control device 230, thereby allowing the chair 247 to tilt.

Figure 27:
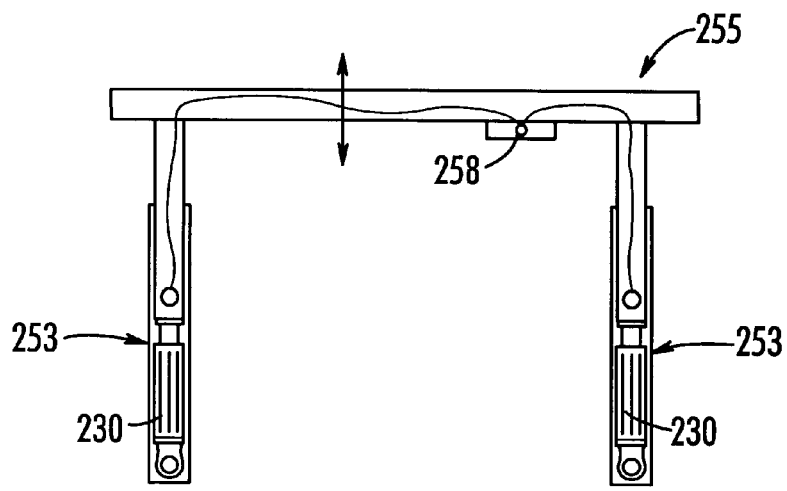
FIG. 27 is a schematic illustration of a height adjustable table employing an embodiment of the present invention.

FIG. 27 illustrates the use of magnetically actuated motion control device 230 as a locking mechanism 253 for an adjustable height table 255. The adjustable height table 255 also includes a control 258 wired to the locking mechanism 253. The control 258 selectively allows selective locking of the adjustable table 255 by alternatively turning the dampers on and off.

Figure 28A:
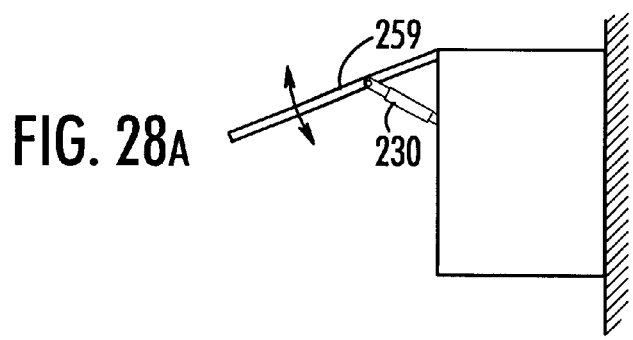
FIG. 28A is a schematic illustration of an embodiment of the present invention used for locking a tilting door.
Figure 28B:
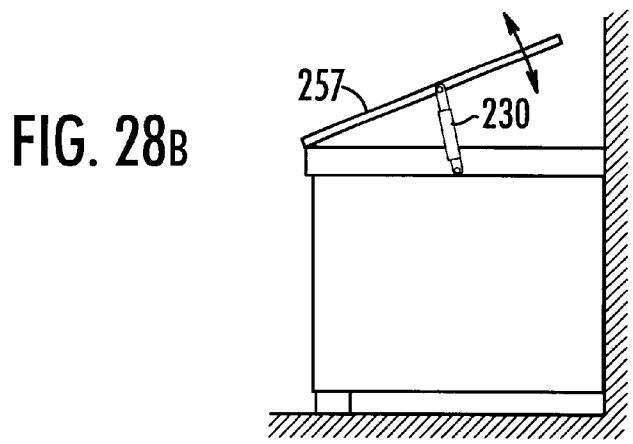
FIG. 28B is a schematic illustration of an embodiment the present invention used for locking a tilting work surface.

FIGS. 28A and 28B show a magnetically actuated motion control device 230 according to the present invention used as a locking mechanism for a tilting work surface 257 into position (FIG. 28B) or for locking a flipper door 259 into place (FIG. 28A).

Figure 29:
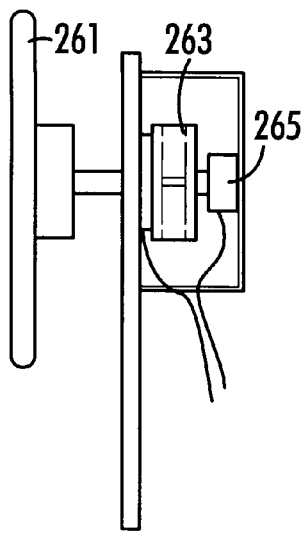
FIG. 29 is a side schematic illustration of an embodiment of the present invention used as a rotary brake in a force feedback steering wheel.

Another area of application for the motion control device of the present invention is the area of haptics, where a linear or rotary embodiment of the invention may be used to provide tactile force feedback to an operator. FIG. 29 illustrates a force-feedback steering wheel 261 that uses a rotary damper 263, such as that described in reference to FIGS. 13 and 14. Such a device can also be used in "steer-by-wire" mechanisms on vehicles such as cars, trucks or industrial jitneys and forklifts. The present invention can also be used in computer games as a force-feedback steering wheel that is responsive to virtual action in a game. In the example shown in FIG. 29, the damper 263 is coupled to a rotary position sensor 265 so that the damping can be coupled to the position of the steering wheel.

Figure 30:
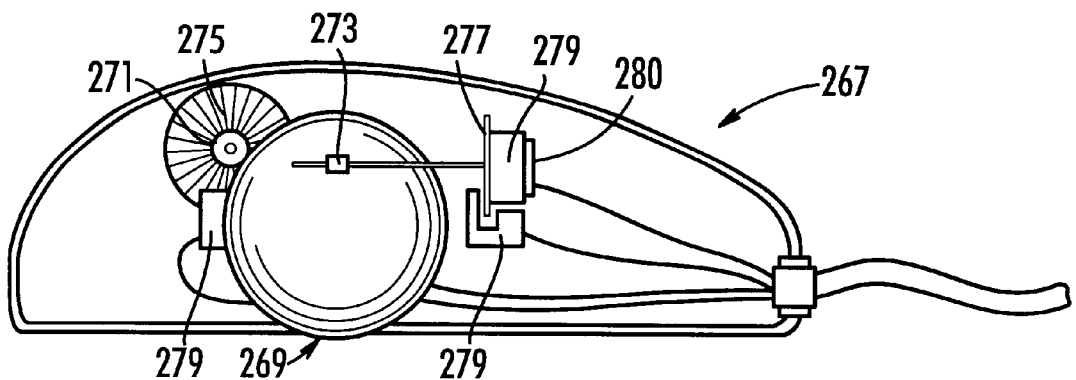
FIG. 30 is a schematic side sectional illustration of a computer pointing device employing an embodiment of the present invention as rotary brakes.

The present invention can also be used as a small controllable friction brake inside computer pointing devices, such as a computer mouse 267 as shown in FIG. 30. The mouse 267 includes a mouse ball 269 that is in rolling contact with a y-drive pinion 271 and an x-drive pinion 273. The drive pinions 271, 273 are each respectively coupled to a y-encoder wheel 275 and a x-encoder wheel 277 with a rotary brake 279 of the type described in reference to FIGS. 13 and 14, for example. Each encoder wheel 275, 277 is positioned so as to rotate through an encoder sensor 280. The rotation of an encoder wheel is sensed by a respective encoder which sends an electrical signal representing the movement of the mouse ball 273 in an x-y plane which passes through pinions 271, 273.

Figure 31:
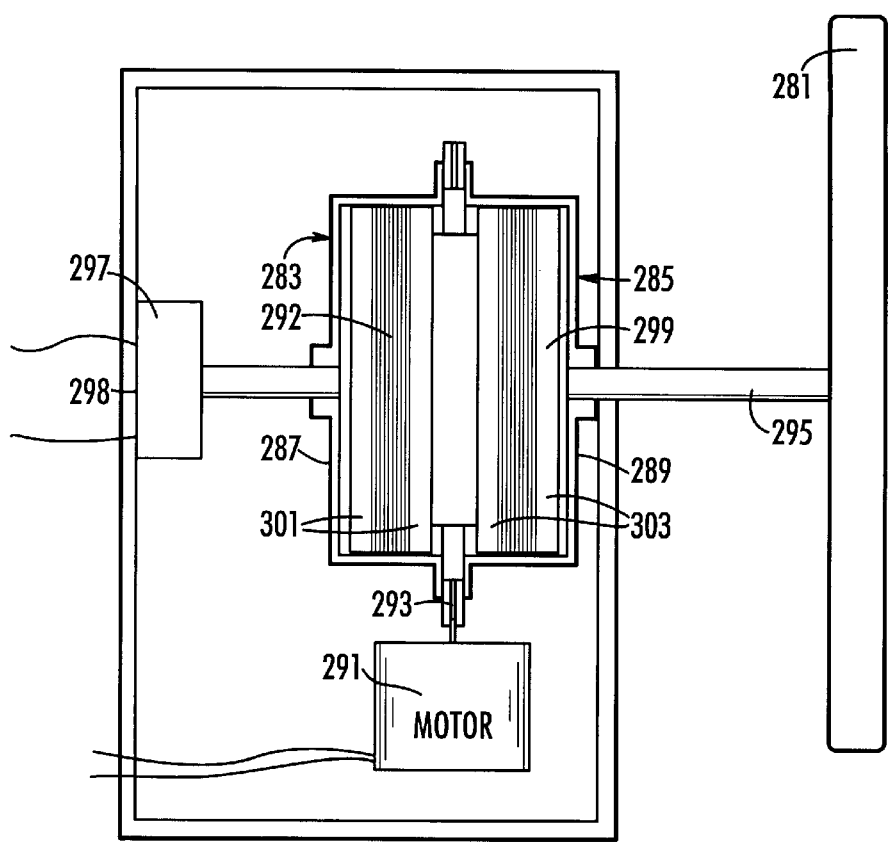
FIG. 31 is a schematic side sectional illustration of an active force feedback steering wheel employing an embodiment of the present invention as a brake.

The invention can also be used to provide an active force feedback steering wheel 281 as shown in FIG. 31. In this application a pair of clutches 283, 285, similar in structure to the rotary damper described with reference to FIGS. 13 and 14, are used to selectively couple the steering wheel 281 to either clockwise or counter-clockwise rotating housings 287, 289. In a clutch arrangement, the stator and the housing are each rotatable, and are rotatable relative to one another. A motor 291 is coupled to clockwise and counter-clockwise housings 287, 289 by a pinion drive 293. A shaft 295 extending from the steering wheel passes through the housing 289 and is coupled to stators 297, 299 of the clutches 283, 285, respectively. The shaft 295 can include bearings or other similar structures where the shaft passes through the housings 287, 289, to permit relative rotational movement between the shaft and the housings. A rotary position sensor 298 is coupled to the end of shaft 295 to detect the rotation of the steering wheel 281. The stators 297, 299, provide friction damping in the clockwise and counter-clockwise directions as in the manner described with reference to FIGS. 13 and 14 with contact surfaces 301, 303. Thus, the steering wheel 281 can actually be forced to turn with a prescribed amount of force in either direction with the ultimate driving source being a simple single direction motor 291.

Figure 32:
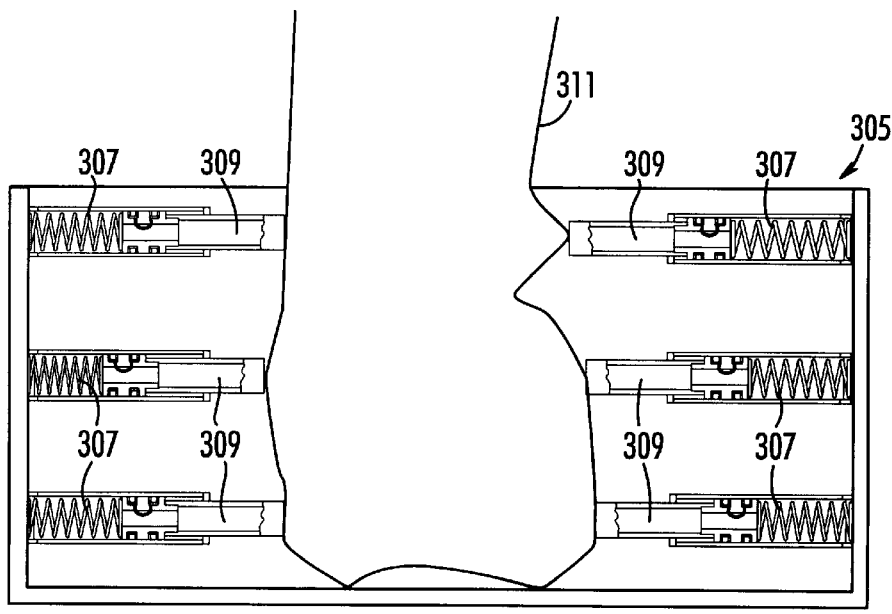
FIG. 32 is a schematic illustration of a device for holding irregular objects employing an embodiment of the present invention.

The invention can also be used in flexible fixturing systems such as the fixturing system 305, schematically illustrated in FIG. 32. In this example, an array of struts 307, like those described in reference to FIG. 11, are each coupled to extensions 309 and are used to hold an irregularly shaped object 311 in position for machining or gauging of the object 311. Each of the struts 307 can selectively lock or release an extension 309 so that objects of various sizes and shapes can be accommodated and held in place.

In addition to the embodiments of the present invention shown in FIGS. 1–23 and described hereinabove, other embodiments of the present invention shown in FIGS. 33–43 can be interchanged for the exemplary magnetically actuated control devices illustrated in the applications described with reference to FIGS. 24–32.

Figure 33:
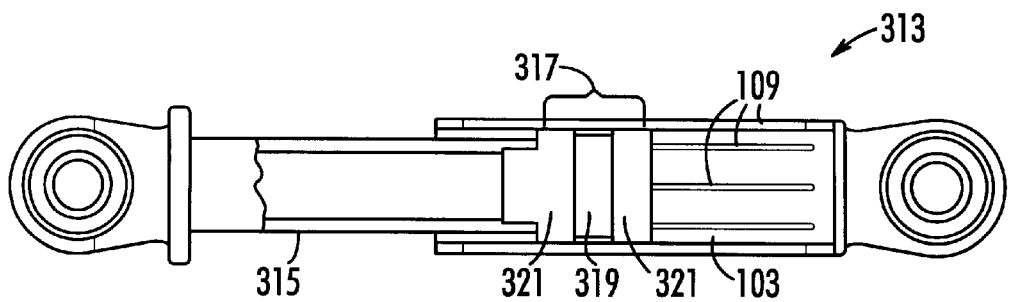
FIG. 33 is a cutaway side sectional view of a sixteenth exemplary embodiment according to the present invention.

The sixteenth preferred embodiment of the motion control device is illustrated in FIG. 33. As seen in FIG. 33, the motion control device is comprised of a damper 313 that includes a housing 103 having slots 109 and a piston 315 having a magnetically active portion 317 that includes a permanent disk magnet 319 sandwiched between core pieces 321. The core pieces 321 are held together by the magnetic field generated by the permanent magnet 319, eliminating the need for connectors or adhesives in the magnetically active portion of the piston 315. Thus, the assembly of the damper 313 is greatly simplified. Because the magnetic field generated by the permanent magnet 319 cannot be varied, the damper 313 is always in an on-state. That is, the housing 103 always squeezes the piston 315 with the same force.

Figure 34:
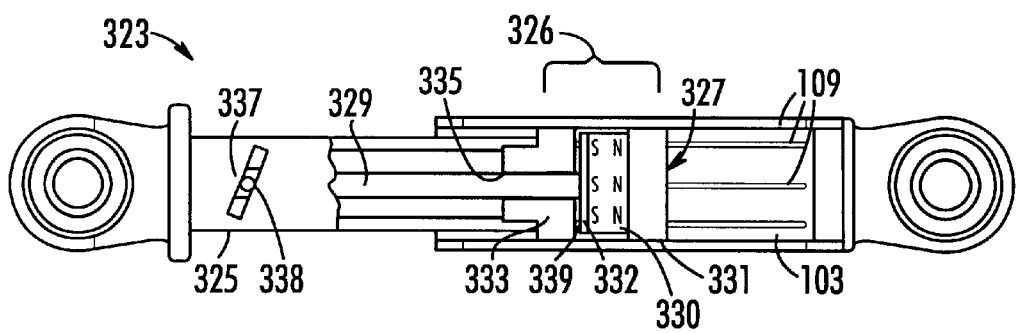
FIG. 34 is a cutaway side sectional view of a seventeenth exemplary embodiment according to the present invention.
Figure 35:
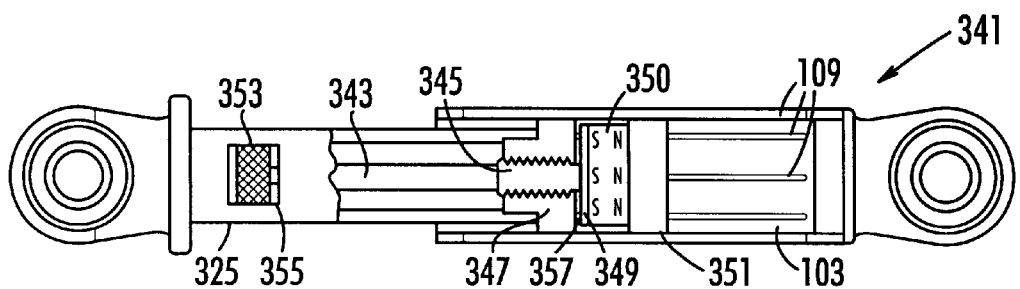
FIG. 35 is a cutaway side sectional view of a eighteenth exemplary embodiment according to the present invention.

Seventeenth and eighteenth exemplary embodiments of the motion control device of the present invention are illustrated in FIGS. 34 and 35. However, as seen in FIGS. 34 and 35, the squeezing force between the housing and the magnetically active portion of the piston can be varied by introducing a variable width gap into the magnetically active portion of the damper. As seen in FIG. 34, a damper 323 of this type includes a housing 103 including a plurality of slots 109, within which a hollow piston 325 is located. A magnetically active portion 326 of the piston 325 includes an end 327 connected to a control rod 329. The end 327 includes an axially polarized disk magnet 330 that is sandwiched between a cap piece 332 and a first pole piece 331. The control rod 329 is attached to the cap piece 332.

According to an exemplary embodiment shown in FIG. 34, a second pole piece 333 is attached to the hollow piston 325. A clearance 335 between the control rod 329 and the second pole piece 333 allows the second pole piece 333 to slide relative to the control rod 329. A lever 337 located on the outer surface of the piston 325 is connected to the control rod 329 through an opening 338 in the piston 325 so that as the lever 337 is turned, the control rod 329 pushes the end 327 of the magnetically active portion 326 toward or away from the second pole piece 333 attached to the hollow piston 325. In this way, an air gap 339 of variable size is introduced into the magnetically active portion 326. The gap 339 increases the reluctance within the magnetically active portion 326, thereby diminishing both the force with which the housing 103 squeezes the piston 325, and also the frictional damping force produced by the damper.

Alternatively, as seen in FIG. 35, a damper 341 according to the present invention can include a control rod 343 having a threaded end 345 that threads into a tapped second pole piece 347 that is attached to the hollow piston 325. Like the embodiment shown in FIG. 34, the control rod 343 is attached (at the threaded end 345) to a cap piece 349 that sandwiches an axially polarized disk magnet 350 with a first pole piece 351. The control rod 343 is connected to a knob 353 that is exposed through an opening 355 in the hollow piston 325. Rotating the knob 353 rotates the control rod 343 and causes the tapped second pole piece 347 to move relative to the cap piece 349. In this way, a variable air gap 357 is introduced into the magnetically active portion. As discussed in reference to the embodiment shown in FIG. 34, the variable gap 357 can be used to control (diminish) the damping force produced by the damper.

Figure 36A:
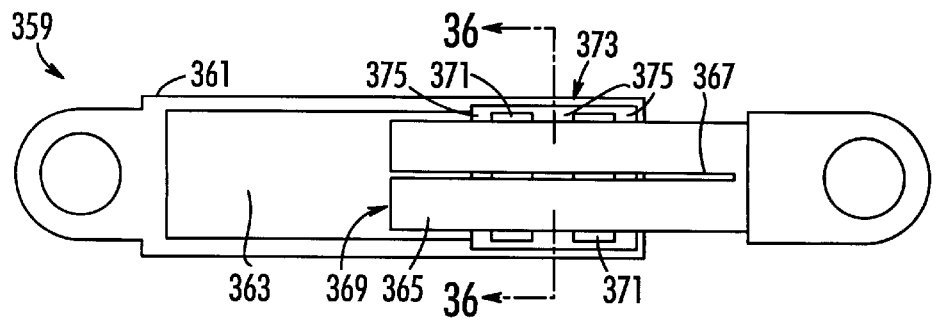
FIG. 36A is a schematic side sectional view of a nineteenth exemplary embodiment according to the present invention.
Figure 36B:
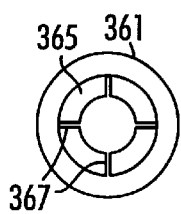
FIG. 36B is a sectional view taken along section 36—36 in FIG. 36A.

Nineteenth and twentieth exemplary embodiments of the motion control device of the present invention are illustrated by FIGS. 36A–37B, and 38A–38B respectively. As seen in FIGS. 36A–38B, according to the present invention the components of a magnetically actuated motion control device can be reversed with respect to the other exemplary embodiments discussed thus far. For example, as seen in FIGS. 36A and 36B, a damper 359 includes a housing 361 that defines a cavity 363 in which a piston 365 is located. The piston 365 includes four slots 367 that extend from an open end 369 of the piston 365. Although the piston 365 is tubular, a piston can have any suitable cross-sectional area such as square, cylindrical etc. A magnetic field generator, such as coils 371 (shown schematically), is located in a magnetically permeable assembly 373 having pole pieces 375. At least a portion of the slotted piston 365 is magnetically permeable so that when a magnetic field is generated by the coils 371, the piston flexes and presses outward against the pole pieces 375 of the magnetic assembly 371 located on the housing 361. Accordingly, the friction damping force can be controlled by controlling the magnetic field generated by the coils 371.

Figure 37B:
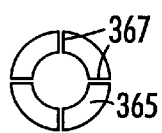
FIG. 37B is an end view of the housing shown in FIG. 37A.
Figure 37A:
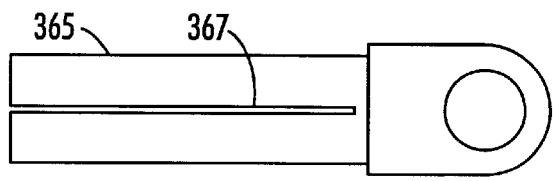
FIG. 37A is a side view of the housing according to the embodiment shown in FIG. 36A.
Figure 38B:
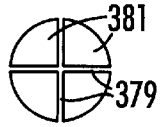
FIG. 38B is an end view of the housing shown in FIG. 38A.
Figure 38A:
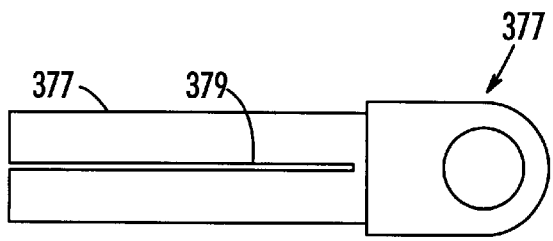
FIG. 38A is a side view of a housing according to a twentieth exemplary embodiment according to the present invention.
Figure 39:
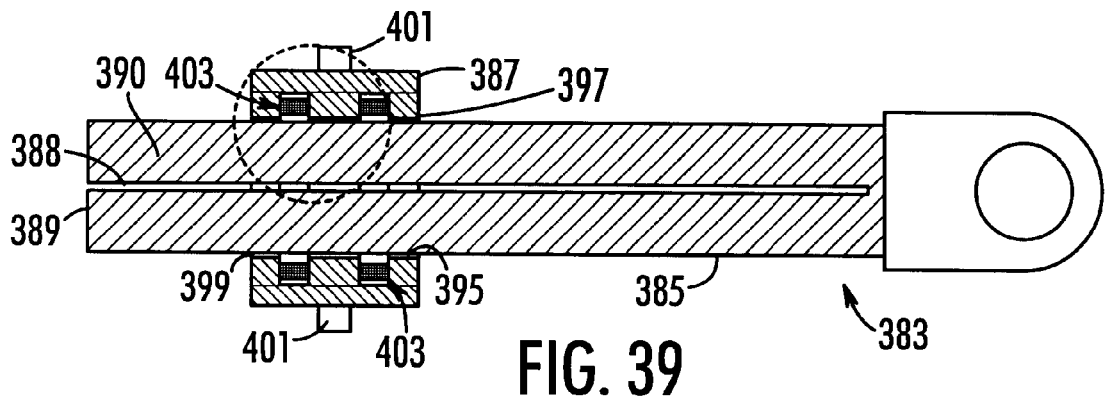
FIG. 39 is a side sectional view of a twenty-first exemplary embodiment of the present invention.
Figure 39A:
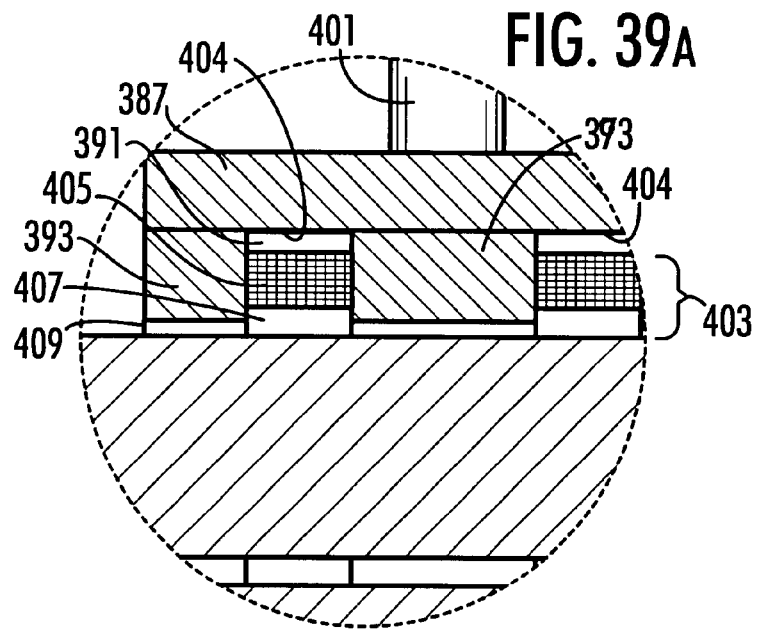
FIG. 39A is a partial view of the housing of FIG. 39.

As seen in FIGS. 37A and 37B, the piston 365 is hollow. A hollow piston is preferred because a hollow piston can easily flex outward in response to an applied magnetic field. However, according to an embodiment shown in FIGS. 38A and 38B, a piston 377 can be solid. Slots 379 extend through the solid piston 377 to define bands, sections, tabs, or fingers 381. The fingers 381 flex outward in response to an applied magnetic field to produce a frictional damping force. An advantage of having a solid piston is that magnetic saturation of the piston can be mitigated.

Other embodiments of a magnetically actuated motion control device according to the present invention include bearing components that contact the components of the magnetically controlled motion control device, e.g., a housing and a piston, and provide smooth relative motion between the components when the motion control device is in its off-state.

For example, a twenty-first exemplary embodiment of the motion control device of the present invention is illustrated in FIGS. 21 and 39–41C. A magnetically actuated motion control device 383 includes a piston 385 which fits within a housing 387. The piston 385 includes one or more longitudinal slots 388 which extend through an end 389 of the piston 385 to define one or more fingers 390. The housing 387 includes magnetic field generators, such as coils 391, mounted between pole pieces 393. The housing 387 defines a cavity 395 connecting opposing open ends 397, 399 of the housing 387. In this way, the piston 385 can pass through both open ends 397, 399 of the housing 387 during its stroke. Accordingly, the axial length of the housing 387 can be much shorter than the axial length of the piston 385, thereby providing a compact device. Trunnion mounts 401, which extend from the housing 387, allow the open ended housing 387 to be mounted to a separate device.

Turning to a partial view 39A, a bearing assembly 403 is located radially inward of each of the coils 391 and within radial grooves 404 defined by the pole pieces 393 of the housing 387. Each bearing assembly 403 includes an annular spring 405 (see also, FIG. 41B) located between a coil 391 and an expandable bearing 407. Preferably, the spring is a band of compliant, elastomeric material, e.g., a sponge material or an O-ring.

The expandable bearing 407 contacts the surface of the piston 385 and is biased by the spring 405 radially inward toward the outer surface of the piston 385. As a result, a small gap 409 is maintained between the housing 387 and the piston 385 when the coils 391 are not energized. Preferably, the radial thickness of each bearing 407 is greater than the thickness of the gap 409 so that the bearing remains captured within the respective radial groove 404. Preferably, only the bearings 407 contact the outer surface of the piston 385 when the magnetically actuated motion control device is in its off-state. By spacing a plurality of bearings 407 axially along the housing 387, the piston 385 and the housing 387 are prevented from binding, or moving out of axial alignment relative to one another (also referred to as "cocking") when the device is in an off-state.

Energizing the coils 391 causes the fingers 390 to flex in a radially outward direction and press against the inner surface of the housing 387. At the same time, each bearing 407 is pressed outward by the fingers 390, thereby compressing the spring 405. Thus, when the motion control device 383 is in its on-state, the gap 409 between the housing 387 and the piston 385 is eliminated as seen in FIGS. 40, 40A and 41A as the magnetic field generated by the coils 391 causes the housing 387 and the piston 385 to press firmly against one another.

In order to provide firm contact between the housing 387 and the piston 385, the bearing 407 must expand radially as the fingers 390 flex toward the housing 387 in response to a magnetic field generated by the coils 391. As seen in FIG. 41C, one embodiment of the annular bearing includes a split 411 to allow for radial expansion. Optionally, split 411 can be eliminated by forming bearing 407 of a material flexible enough to permit its radial expansion. Preferably, the bearing is made from a strip of flexible, low friction material. Examples of suitable bearing materials include nylon materials, e.g., molybdenum disulfide filled nylon fibers, Hydlar HF (A. C. Hyde Company, Grenloch, N.J.), which is a material including nylon reinforced with Kevlar fibers, polytetrafluoroethylene materials, e.g., Teflon®, Derlin AF® (E. I. Dupont Nemours and Co., Wilmington, Del.), which is teflon filled with an acetal homopolymer, and Rulon® (Dixon Industries, Bristol, R.I.), which is a material including Teflon® reinforced Kevlar® fibers, Vespel® (E. I. Dupont Nemours and Co., Wilmington, Del.), which is a polyimide material, Ryton® (Philips Petroleum Co., Battlesville, Okla.), which is a material including polyphenylene sulfide filled with carbon fiber, or brass. The preceding list is not exhaustive, and other suitable materials will be apparent to one with ordinary skill in the art.

Figure 42:
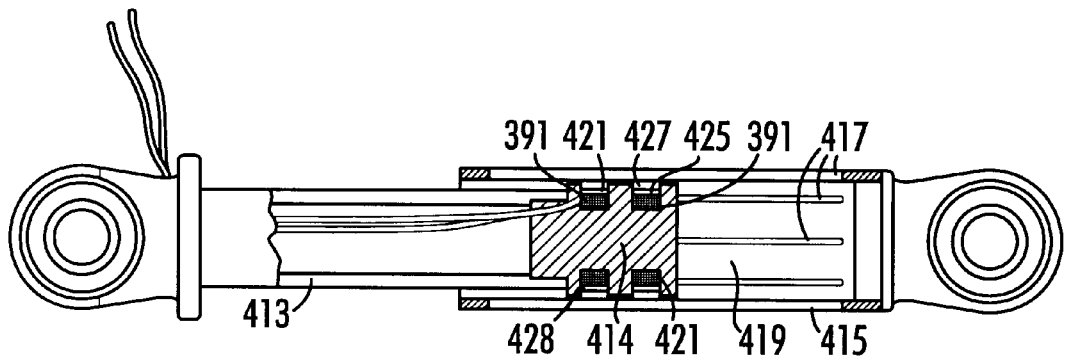
FIG. 42 is a cutaway side sectional view of a twenty-second exemplary embodiment according to the present invention.

As explained earlier, the magnetic field generators, e.g., coils can be mounted to either the housing or the piston with the other of the housing or the piston being split into one or more flexible fingers. FIG. 42 shows a twenty-second embodiment of the present invention including a piston 413 having two magnetic coils 391 located within a core 414 and a slotted housing 415 in which the piston 413 is located. Like the embodiments discussed in reference to FIGS. 1 and 2, the housing 415 includes one or more longitudinal slots 417 that define one or more flexible fingers 419.

The piston 413 slides within the housing 415 on bearing assemblies 421, which are each located radially inward of the coils 391 and bear against the inner surface of the housing 415. Each bearing assembly includes an annular spring 425, which is located between an annular bearing 427 and one of the respective coils 391. The spring 425 biases the bearing 427 radially outward and away from the magnetically active portion of the piston to create a gap 428 between the outer surface of the piston 413 and the inner surface of the housing 415. Preferably, each bearing 427 and spring 425 are of the same structures and materials as those discussed in reference to FIGS. 39–41.

Figure 43:
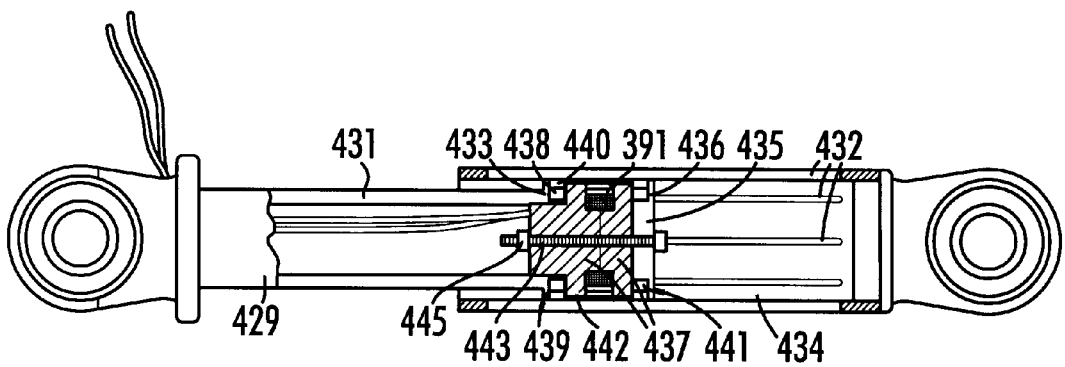
FIG. 43 is a cutaway side sectional view of a twenty-third embodiment according to the present invention.

According to a twenty-third exemplary embodiment shown in FIG. 43, bearing assemblies are located axially spaced from coils 391. In this embodiment a piston 429 is located within a housing 430 having structure such as that described in reference to FIG. 42, including slots 432 defining one or more fingers 434. The piston 429 includes a main body 431 having a shoulder 433 at one end, an end cap 435 including a shoulder 436 that opposes the shoulder 433 and two steel cores 437 sandwiched between the end cap 435 and the main body 431.

A first bearing assembly 439 is located between the cores 437 and the shoulder 433 in the cores 437. A second bearing assembly 441 is located between the shoulder 436 and the main body 431. Each bearing includes a spring 438 that biases a bearing 440 against the inner surface of the housing 430. Preferably, the spring 438 and bearing 440 are constructed in the same manner as described with respect to the previous embodiments. The bearings 440 are biased against the inner surface of the housing 430 to create a gap 442 between the cores 437 and the inner surface of the housing 430 when the coils are not energized, i.e., the magnetically actuated motion control device is in an off-state.

The cores 437 are secured to the main body of the piston 429 by an interference fit between the outer surface of the cores 437 and the inner surface of the piston 429. The cores 437 and end cap 435 are secured to one another by a bolt 443 and a nut 445. The bolt 443 passes through aligned bores in the cores 437 and the end cap 435. Accordingly, as exemplified by this embodiment, the bearing assemblies need not be located between the magnetic field generator (e.g., coils 391) and the opposing slotted member.

While two magnetic field generators, e.g., coils 391, are illustrated in FIGS. 39–42, one of ordinary skill in the art will readily appreciate that one, or three or more, magnetic field generators may alternatively be used within the spirit and scope of the invention. Similarly, although two bearing assemblies are illustrated in FIGS. 39–42 one or more bearing assemblies may be used within the spirit and scope of the invention.

Advantages of using bearing assemblies in a magnetically actuated motion control device in order to create a gap between the housing and the piston include maintaining the piston and the housing in axial alignment and creating smooth, fluid-like, relative movement between the housing and the piston while the damper is in its off-state.

Figure 44:
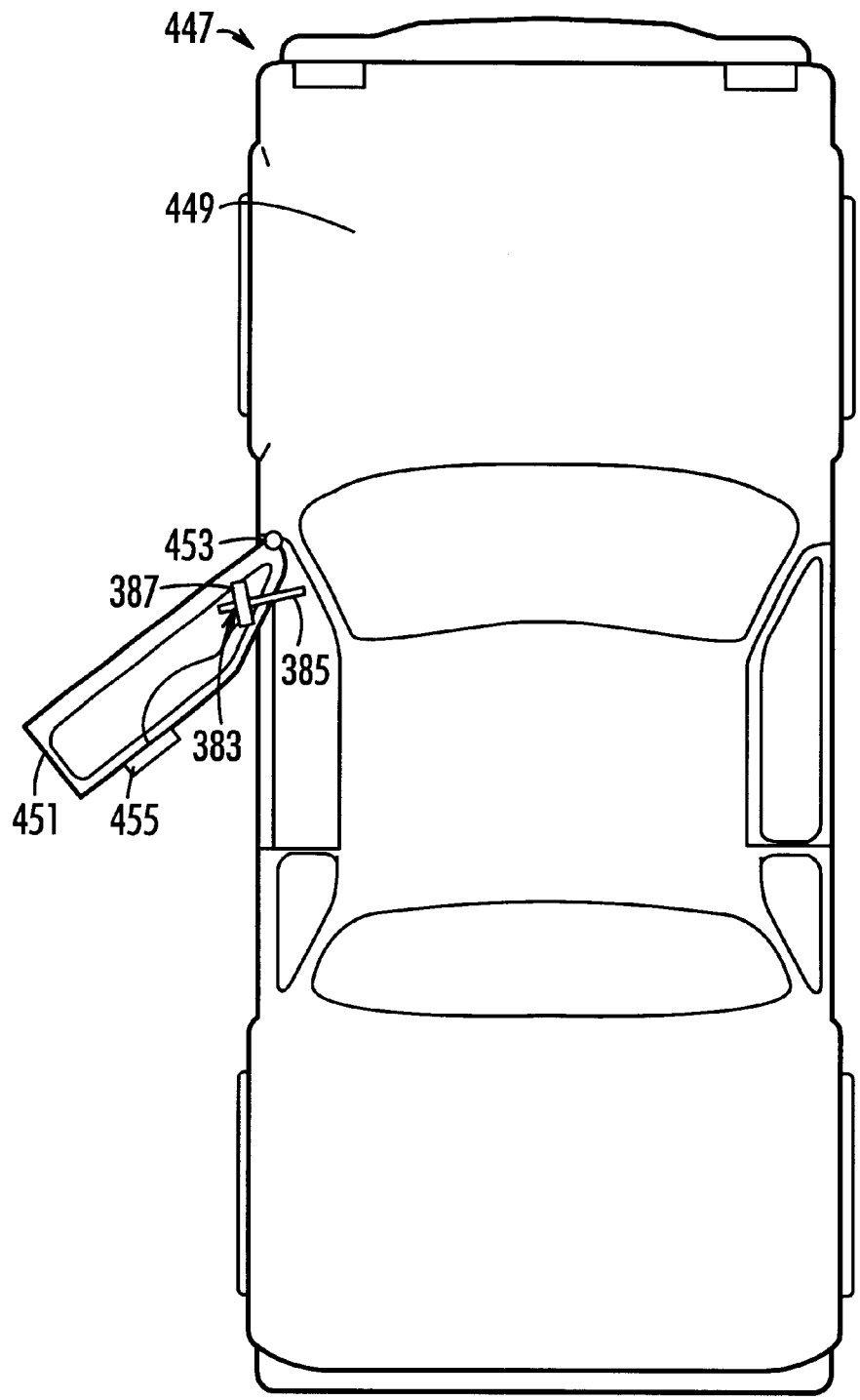
FIG. 44 is a schematic view of the embodiment shown in FIG. 39 employed in a car door.

An example of a situation in which it may be important to provide smooth movement between the housing and the piston is when an embodiment of the present invention is used as a locking mechanism in a hinged vehicle door. In the example shown in FIG. 44, a car 447 includes a body 449 and a door 451 that swings on a hinge 453 relative to the body 449. The housing 387 of a motion control device 383 (shown in FIGS. 40–41C) is mounted in the door 451 of the car 447. Because the door 451 has limited space in which to fit extra components, the housing 387 is preferably short relative to the length of the piston 385. The slotted piston 385 is attached at one end to the body of the car. As the door is swung open and closed, the piston 385 moves within the housing 387. An operator can lock the door 451 into any position by activating a switch 455 which energizes the magnetic field generator to cause the piston and the housing to press against one another together, thus holding the door in position.

The present invention has been described with reference to exemplary embodiments. However, it will be readily apparent to those skilled in the art that it is possible to embody the invention in specific forms other than as described above without departing from the spirit of the invention. The exemplary embodiments are illustrative and should not be considered restrictive in any way. The scope of the invention is given by the appended claims, rather than the preceding description, and all variations and equivalents which fall within the range of the claims are intended to be embraced therein.

What claimed is:

1. A magnetically actuated motion control device, the motion control device comprising:
   A) a housing defining a cavity, the housing including at least one slot therethrough defining at least one moveable finger;
   B) a second member positionable within the cavity and being movable relative to the housing when positioned therein; and
   C) a magnetic field generator located on the second member, the magnetic field generator causing at least one of the at least one moveable fingers to press against the second member to produce frictional damping.

2. The magnetically actuated motion control device of claim 1, wherein the housing includes an open end, and wherein the at least one slot extends through the open end of the housing.

3. The magnetically actuated motion control device of claim 1, wherein the housing is tubular and the movable member is a sliding piston located within the tubular housing.

4. The magnetically actuated motion control device of claim 1, wherein the movable member is a stator having a center axis, the stator and the housing being relatively rotatable around the axis.

5. The magnetically actuated motion control device of claim 1, wherein the housing includes two slots and a cross slot, the two slots being connected by the cross slot to define the finger having a free end.

6. The magnetically actuated motion control device according to claim 1, wherein the housing includes a first slot, and a second slot.

7. The magnetically actuated motion control device according to claim 6, wherein the first and second slots are parallel.

8. The magnetically actuated motion control device according to claim 6, wherein the first and second slots extend in a direction parallel to a direction between the first and second ends.

9. The magnetically actuated motion control device according to claim 8, wherein the housing comprises four slots and two cross slots which define two fingers, the four slots being spaced apart around the housing, each of the cross slots connecting together two slots.

10. The magnetically actuated motion control device according to claim 9, wherein the two cross slots are positioned adjacent opposite ends of the housing.

11. The magnetically actuated motion control device according to claim 6, wherein the first and second slots extend in a direction perpendicular to a direction extending between the first and second ends.

12. The magnetically actuated motion control device according to claim 11, further comprising a cross slot, the first and second slots being connected by the cross slot to define two fingers each having a free end.

13. The magnetically actuated motion control device according to claim 12, wherein the housing comprises four slots and two cross slots which define four fingers, the four slots being spaced apart in pairs around the housing, each of the cross slots connecting together a pair of slots.

14. The magnetically actuated motion control device of claim 1, wherein the movable member has a first outer end and the housing has a closed end, and wherein the device further comprises a spring located between the outer end of the movable member and the closed end of the housing.

15. The magnetically actuated motion control device of claim 1, further comprising: an acoustic insulating material located around the housing.

16. The magnetically actuated motion control device of claim 1, wherein the movable member has an outer surface and the cavity has an inner surface and wherein the device further comprises a friction increasing material located on an inner surface of the cavity or on an outer surface of the movable member.

17. The magnetically actuated motion control device of claim 1, wherein a lubricant is provided between the movable member and the housing.

18. The magnetically actuated motion control device of claim 1, wherein the magnetic field generator includes at least one coil.

19. The magnetically actuated motion control device of claim 18, further comprising a second coil spaced from the first coil, and wherein the first and second coils are configured so a resulting magnetic field is a sum of a magnetic field produced by the first coil and a magnetic field produced by the second coil.

20. The magnetically actuated motion control device of claim 18, wherein a permanent magnet is located adjacent to the first coil, and wherein the first coil counters a magnetic field generated by the permanent magnet.

21. The magnetically actuated motion control device of claim 20, wherein the permanent magnet is a disk magnet.

22. The magnetically actuated motion control device of claim 20, wherein the permanent magnet is a ring magnet, the ring magnet defining a non-magnetic gap at a center of the ring magnet.

23. The magnetically actuated motion control device of claim 1, further comprising:
a sensor selected from the group consisting of a linear potentiometer, a velocity sensor, and an accelerometer, the sensor positioned to sense a positional or dynamic characteristic of one of the first member and the second member relative to the other of the first member and the second member.

24. The magnetically actuated motion control device of claim 23, wherein the sensor is a linear potentiometer.

25. The magnetically actuated motion control device of claim 24, wherein the linear potentiometer has a first member attached to the housing and a second member coupled to the movable member, and wherein relative movement between the first portion and the second portion indicates the position of the movable member relative to the housing.

26. The magnetically actuated motion control device according to claim 23, wherein the moveable member includes a depression and the sensor includes an extension on the second member, the extension being adapted to fit through the slot in the housing and into the depression in the movable member and thereby couples the second member of the sensor to the movable member.

27. The magnetically actuated motion control device according to claim 26, wherein the depression is a circumferential groove in the movable member.

28. The magnetically actuated motion control device according to claim 23, wherein the second member of the sensor is configured to be in rolling contact with the movable member, and wherein relative rotation between the first member of the sensor and the second member of the sensor indicates the relative position between the movable member and the housing.

29. The magnetically actuated motion control device according to claim 28, wherein at least a portion of the movable member includes a rack, and wherein the second member of the sensor is a pinion gear that is located to intermesh with the rack.

30. The magnetically actuated motion control device according to claim 23, wherein the sensor is an optical encoder.

31. The magnetically actuated motion control device according to claim 1, further comprising first and second pole pieces, wherein the magnetic field generator is a permanent disk magnet, and wherein the permanent disk magnet is sandwiched between the first pole piece and the second pole piece.

32. The magnetically actuated motion control device according to claim 31, further comprising an adjustable gap located between the first pole piece and the permanent disk magnet.

33. The magnetically actuated motion control device according to claim 32, wherein the movable member defines an open interior space and wherein the first pole piece has an opening therethrough and is connected to the moveable member, the device further comprising:

a control rod having a first end, a second end, and an adjustor, the control rod being located at least partially within the open interior space of the moveable member, the first end of the control rod coupled to the adjustor, the second end of the control rod being connected to the disk magnet and the second pole piece; and
wherein the first pole piece is spaced from and slidable relative to the control rod to create the adjustable gap.

34. The magnetically actuated motion control device according to claim 33, further comprising an opening in the moveable member, and wherein the adjustor comprises a lever extending through the opening for moving the control rod relative to the first pole piece.

35. The magnetically actuated motion control device according to claim 33, further comprising an opening in the moveable member, wherein the adjustor comprises a knob extending through the opening, the knob rotating the control rod, the second end of the control rod includes an externally threaded screw portion, and wherein the first pole piece is internally threaded to intermesh with the control rod threaded screw portion so that as the control rod is rotated the first pole piece moves axially relative to the permanent magnet and the second pole piece.

36. A magnetically actuated motion control device, comprising:
a housing member including a cavity formed therein, and including at least one finger provided along the housing;
a second member disposed in the cavity; and
at least one magnetic field generator mounted to cause each of the at least one fingers to be displaced toward the second member and thereby squeeze the second member.

37. A method for controlling relative motion between a housing having at least one slot defining at least one finger and a movable member that is movable relative to the housing, the housing defining a cavity in which the movable member is located, the method comprising the steps of:
generating a magnetic field; and
displacing each of the at least one fingers and pressing the finger against the movable member in accordance with the generated magnetic field.

38. A housing for a magnetically actuated motion control device, the housing comprising:
a first end and an open second end, the housing formed of a magnetically attractable material;
a cavity in the housing extending between the first end and the second end; and
a slot extending through the housing to define a finger in the housing, said finger adapted to press into contact with a member located in said cavity.

39. The housing according to claim 38, wherein the housing has a cylindrical shape.

40. The housing according to claim 38, wherein the slot extends in a direction parallel to a direction between the first and second ends.

41. The housing according to claim 38, wherein the slot extends in a direction perpendicular to a direction between the first and second ends.

42. The housing according to claim 38, further comprising a plurality of slots extending through the housing.

43. The housing according to claim 38, wherein the slot is a first slot, and further comprising a second slot, the first and second slots being spaced apart.

44. The housing according to claim 43, wherein the first and second slots are parallel.

45. The housing according to claim 43, wherein the first slot and the second slot are axially-periodically spaced.

46. The housing according to claim 43, wherein the first and second slots extend in a direction parallel to a direction between the first and second ends.

47. The housing according to claim 46, further comprising a cross slot, the first and second slots being connected by the cross slot to define finger having a free end on at least one finger.

48. The housing according to claim 47, wherein the housing comprises four slots and two cross slots defining two fingers, the four slots spaced apart around the housing, each of the cross slots connecting together two slots.

49. The housing according to claim 48, wherein the two cross slots are positioned adjacent opposite ends of the housing.

50. The housing according to claim 43, wherein the first and second slots extend in a direction perpendicular to a direction between the first and second ends.

51. The housing according to claim 50, further comprising a cross slot, the first and second slots being connected by the cross slot to define two fingers each having a free end.

52. The housing according to claim 51, wherein the housing comprises four slots and two cross slots defining four fingers, the four slots being spaced apart in pairs around the housing, each of the cross slots connecting together a pair of slots.

53. A magnetically actuated motion control device, comprising:

a first member defining a cavity, the first member including at least one slot therethrough defining at least one moveable finger;

a second member positionable within the cavity and being movable relative to the first member when positioned therein; and a magnetic field generator located on another of the first member and the second member, the magnetic field generator causing at least one of the moveable fingers to press against the second member to produce frictional damping.

54. A magnetically actuated motion control device according to claim 53, further comprising:

a first bearing assembly including a first expandable bearing positioned to contact a surface of the one of the first member and the second member having the at least one slot and a first spring located between another of the first member and the second member and the expandable bearing so that the spring biases the first bearing against the surface of the one of the first member and the second member.

55. The magnetically actuated motion control device according to claim 54, wherein the first spring is located between the magnetic field generator and the first bearing.

56. The magnetically actuated motion control device according to claim 54, further comprising:

a second bearing assembly including a second expandable bearing positioned to contact a surface of the one of the first member and the second member having the at least one slot and a second spring located between another of the first member and the second member and the second expandable bearing so that the second spring biases the second bearing against the surface of the one of the first member and the second member.

57. The magnetically actuated motion control device according to claim 56, wherein the first member is a housing and the second member is a piston having the at least one slot defining the at least one finger, and wherein the first bearing assembly and the second bearing assembly are located on the housing.

58. The magnetically actuated motion device according to claim 57, further comprising first and second magnetic field generators wherein the first and second bearing assemblies are located radially between the first and second magnetic field generators and a surface of the piston.

59. The magnetically actuated motion control device according to claim 56, wherein the first member is a housing having the at least one slot defining the at least one finger, the second member is a piston located within the cavity, and wherein the first bearing assembly and the second bearing assembly are located on the piston.

60. The magnetically actuated motion control device according to claim 59, wherein the first bearing assembly is located radially between the first magnetic field generator and the housing and the second bearing assembly is located radially between the second magnetic field generator and the housing.

61. The magnetically actuated motion control device according to claim 58, wherein at least one coil is spaced axially between the first spring assembly and the second spring assembly.

62. The magnetically actuated motion control device according to claim 56, wherein the magnetic field generator is axially spaced between the first bearing assembly and the second bearing assembly.

63. The magnetically actuated motion control device as claimed in claim 53 wherein the device is a damper.

64. The magnetically actuated motion control device as claimed in claim 53 wherein the device is a brake.

65. The magnetically actuated motion control device as claimed in claim 53 wherein the device is a lock.

66. A system comprising:

a vehicle including a body and a door, the door being attached by a hinge to the body; and a magnetically actuated motion control device according to claim 54 mounted between the door and the body.

67. A system comprising:

a vehicle including a body and a door, the door being attached by a hinge to the body; and a magnetically actuated motion control device according to claim 1 mounted between the door and the body.

* * * * *